US006993905B2

(12) United States Patent
Min et al.

(10) Patent No.: US 6,993,905 B2
(45) Date of Patent: Feb. 7, 2006

(54) OIL HYDRAULIC CYLINDER

(76) Inventors: Kyung-Han Min, 240-505 Jugong APT., 2, Godeok 2-dong, Kangdong-gu, Seoul, 134-082 (KR); Myung-Yong Hwang, 103-712 Hyundai APT., 109-1 Yangji-ri, Onam-myeon, Namyangju-city, Gyeonggi-do, 472-881 (KR); Keun-Jong Lee, 1611-406 Jugong APT., 624 Sangkye-dong, Nowon-gu, Seoul, 139-200 (KR)

( * ) Notice: Subject to any disclaimer, the term of this patent is extended or adjusted under 35 U.S.C. 154(b) by 65 days.

(21) Appl. No.: 10/437,702

(22) Filed: May 14, 2003

(65) Prior Publication Data

US 2003/0213665 A1 Nov. 20, 2003

(30) Foreign Application Priority Data

May 17, 2002 (KR) ..................... 20-2002-0015055

(51) Int. Cl.
*F16D 31/02* (2006.01)

(52) U.S. Cl. .......................................... 60/477; 60/482

(58) Field of Classification Search .................. 60/477, 60/482, 413
See application file for complete search history.

(56) References Cited

U.S. PATENT DOCUMENTS 644,641 A * 3/1900 Sibley ......................... 60/482
1,999,848 A * 4/1935 Ries ............................ 60/474
3,146,592 A * 9/1964 Johnson ....................... 60/442
3,230,712 A * 1/1966 Redfield ...................... 60/482
6,155,642 A 12/2000 Kawakami et al. ......... 297/344

* cited by examiner

*Primary Examiner*—F. Daniel Lopez
(74) *Attorney, Agent, or Firm*—St. Onge Steward Johnston & Reens LLC

(57) ABSTRACT

An oil hydraulic cylinder configured to allow an object to be smoothly and continuously lifted without being clatteringly swayed and unnecessarily rotated by the oil hydraulic while supply of the oil hydraulic remains uninterrupted when an adjusting lever is manipulated for lifting and lowering operations, the cylinder comprising: a cap part protrusively formed thereon with a compression unit for forcibly generating oil pressure, an operation unit fixedly connected to an object for lifting, stopping and lowering the object and an adjusting unit for controlling the lifting, stopping and lowering of the object; a body part connected inside a body case to the compression unit, the operation unit and the adjusting unit and formed with a plurality of cylinders and pistons for carrying out an oil pressing operation; a base part coupled underneath the body part and formed therein with a predetermined flow route; an oil control part for controlling oil flowing in an oil route formed inside the base part; and a manipulating unit disposed at one side of the cap part for simultaneously controlling the compression unit, the operation unit and the adjusting unit.

19 Claims, 25 Drawing Sheets

OIL HYDRAULIC CYLINDER

CROSS-REFERENCES TO RELATED APPLICATIONS

This application claims priority from Korean Patent Application No. 2002-15055 filed on May 17, 2003 in the Korean Intellectual Property Office, the disclosures of which are incorporated herein in their entirety by reference.

BACKGROUND OF THE INVENTION

1. Field of the Invention

The present invention relates to an oil hydraulic cylinder for use in industrial purposes or chairs, and more particularly, to an oil hydraulic cylinder configured to smoothly lift a moving object (seat part) without shaking movement thereof when the moving object is lifted by hydraulic pressure and to prevent the moving object from being rotated unnecessarily.

2. Description of the Related Art

As is well known, oil hydraulic cylinders used for jacks for vehicles and other industrial purposes or beauty parlor chairs are equipped with an adjusting lever for lifting or lowering a moving object.

By way of example, a widely used beauty parlor chair having a seat part where a beautician sits for hair cutting is lifted and lowered by a lifting mechanism. The beauty parlor chair is vertically operated by a direct manipulation of an oil hydraulic cylinder, or a combination of an oil cylinder and a parallel link.

A beauty parlor chair using the method of vertically moving a seat part by an oil cylinder is disposed with an oil hydraulic cylinder at a base pedestal thereof, and the oil hydraulic cylinder is mounted with a seat part at a distal end portion thereof to adjust the height of the seat part in response to vertical movement of a piston rod (an operation rod) disposed at the oil hydraulic cylinder side.

In other words, in case of using an oil hydraulic cylinder, a foot is used to repeatedly tread on an adjusting lever to lift a seat part. When the seat part reaches a desired position through the above process, operation of stepping on the adjusting lever is stopped to stop lifting the seat part. Thereafter, when the adjusting lever is trod to the extreme lower end to return the seat part to an original position, the seat part is lowered to come back to the original position.

Meanwhile, as illustrated in FIGS. 1 and 2, where a beauty parlor chair is lifted by a combination method of an oil hydraulic cylinder and a parallel link as patented by Korea Patent No. 344036, a lift mechanism 230 disposed at an upper part of a base pedestal 221 includes a frame 231 defined on an upper side of the base pedestal 221, a first parallel link 250 rotatably connected at one end thereof to the frame 231 and rotatably connected at the other end thereof to a connecting member of link bracket 232, a second parallel link 260 rotatably connected at one end thereof to a pedestal 233 and rotatably connected at the other end thereof to the link bracket 232, a pedestal 233 for supporting a seat part (not shown), a third link rod 270 for connecting the first parallel link 250 to the second parallel link 260 and an oil hydraulic cylinder 280 mounted at the frame 231 and connected to the second parallel link 260.

The first parallel link 250 consists of a first link rod 251 and a first pull rod 252, where the first link rod 251 is rotatably connected at one side thereof to the frame 231 via an axle 253, and the first pull rod 252 is disposed underneath the first link rod 251 and rotatably connected at one side thereof to the frame 231 via an axle 255.

Furthermore, the first link rod 251 is rotatably connected at the other side thereof to a link bracket 232 via an axle 254, and the first pull rod 252 is rotatably connected at the other side thereof to the link bracket 232 via an axle 256.

The second parallel link 260 includes a second link rod 261 and a second pull rod 262, where the second link rod 261 is rotatably connected at one distal end thereof to a pedestal 233 via an axle 263, and the second pull rod 262, being disposed underneath the second link rod 261, is rotatably connected at one distal end thereof to the pedestal 233 via an axle 266. The second link rod 261 is rotatably connected at the other distal end thereof to the link bracket 232 via an axle 264, and the second pull rod 262 is rotatably connected at the other distal end thereof to the link bracket 232 via an axle 266.

The third link rod 270 is rotatably connected at one distal end thereof via an axle 271 to a tip end disassociated at a predetermined distance from an axle 254 relative to the other distal end side of the first link rod 251, and is rotatably connected at the other distal end thereof to the second link rod 261.

The oil hydraulic cylinder 280 composed of a cylinder tube 281 and a piston rod 282 is connected to an oil hydraulic pump (not shown) via a pipe, and is reduced or increased in pressure thereof from the oil hydraulic pump (not shown) by manipulation of an adjusting lever (not shown). In other words, a base pedestal of the cylinder tube 281 is rotatably connected to the frame 231 via a cylinder axle 283 and a distal end portion of the piston rod 282 is rotatably connected to the second link rod 261 via an axle 284.

In the conventional lift mechanism 230 thus described, when a seat part (to be described later) is lifted upwards from a lowest position as illustrated in FIG. 2, by way of example, when a beautician manipulates an adjusting lever (not shown), an oil hydraulic pump (not shown) applies an oil pressure to the oil hydraulic cylinder 280 by manipulation of an adjusting lever (not shown) to elongate the piston rod 282, whereby the second parallel link 260 is rotated upwards about the axles 264 and 266.

At this time, the third link rod 270 pulls up the first parallel link 250 in response to the rotating operation of the second parallel link 260, whereby the first parallel link 250 is rotated upwards about the axles 253 and 255, enabling to allow the pedestal 233 to move upwards maintaining a horizontal state.

Although the second parallel link 260 is rotated counterclockwise about the axles 264 and 266 to allow the pedestal 233 to move forwards at a central position thereof as a result of the pedestal 233 moving upwards, the first parallel link 250 is clockwise rotated about the axles 253 and 255 in cooperation with the rotating operation of the second parallel link 260, whereby the link bracket 232 is moved backwards as much as the pedestal 233 that has moved forwards at the center position thereof, maintaining the center position of the pedestal 233 as is.

Meanwhile, when a seat part 224 is moved downwards, by way of example, when an adjusting lever (not shown) is trodden or pressed, an oil hydraulic pump (not shown) reduces the pressure of the oil hydraulic cylinder 280 to shorten the lengthen the piston rod 282. As a result, the second parallel link 260 is rotated downwards about the axles 264 and 266

At this time, the third link rod 270 pulls down the first parallel link 250 in response to rotating operation of the second parallel link 260 such that the first parallel link 250 is rotated downwards about the axles 253 and 255 and as a result, the pedestal 233 is moved downwards with a horizontal state thereof maintained.

Although the second parallel link 260 is rotated clockwise about the axles 264 and 266 to allow the central position of the pedestal 233 to move backwards in response to the pedestal 233 moving downwards, the first parallel link 250 is rotated counterclockwise about the axles 253 and 255 in cooperation with the rotating operation of the second parallel link 260 whereby the link bracket 232 is moved forwards as much as the central position of the pedestal 233 moving backwards, thereby preventing the central position of the pedestal 233 from being disoriented.

However, there is a drawback in the lifting operation by the conventional oil hydraulic cylinder thus described in that a seat part is lifted by repeated treading of an adjusting lever to reach a predetermined height during which a man on the seat part feels discomfort at every step of pressed stage of the adjusting lever.

There is another drawback in a cylinder type in that a seat part itself is unnecessarily rotated, preventing the seat part from being secured at a desired direction.

These kinds of drawbacks found in a chair may be somewhat considered less problematic if compared with those that might happen in industrial oil hydraulic cylinders or oil hydraulic jacks for vehicles. These problems may cause industrial disasters in the industrial fields.

SUMMARY OF THE INVENTION

The present invention provides an oil hydraulic cylinder configured to allow an object to be smoothly and continuously lifted without being clatteringly swayed and unnecessarily rotated by the oil hydraulic while supply of the oil hydraulic remains uninterrupted when an adjusting lever is manipulated for lifting and lowering operations.

In accordance with the object of the present invention, there is provided an oil hydraulic cylinder comprising a cap part, a body part, and a base part, wherein the cap part comprises: a stopper-shaped cap; a rectangular support part fixedly formed on an upper surface of the cap; an operation hole formed at an upper surface of the support part; a rectangular hitching groove defined at one side of the operation hole; a hitching piece fixedly inserted into the hitching groove; hinge rods fixedly mounted at each distal end portion of the support part; an adjusting hole formed at an upper surface of the cap; a compression hole; coupling holes, each facing the other; and an adjusting part formed at a circumferential side of the cap defined with the adjusting hole; wherein the body part comprises: a body case; a compression rod mounted with a fixation ring thereunder for being inserted into the compression hole of the cap; a first piston formed thereon with a plurality of O-rings and a fixation washer for being mounted under the compression rod and formed with an O-ring thereunder; a first cylinder inserted by the first piston and formed with a threaded part at a lower circumference thereof; a resilience member inserted into a circumferential side of the first cylinder and hitched at one side thereof by the fixation washer of the first piston; a stopper formed with an opening; a second cylinder coupled via the stopper and a threaded part; a resilience member inserted into the second cylinder; a first piston pad fixedly inserted into the second cylinder for pressing the resilience member; an operation rod formed at one side thereof with a predetermined length of cut-out surface for insertion into the operation hole of the cap and formed thereunder with a second piston pad defined with a plurality of O-rings; a third cylinder formed thereon with a cut-out part for insertion of an operation rod; an adjusting rod formed at a mid-upper section thereof with a hitching groove for being inserted into the adjusting hole of the cap and fixedly mounted at a mid-section thereof with a fixation ring; a control rod fixedly mounted thereon with a fixation ring for being mounted under the adjusting rod and formed thereunder with a second adjusting groove and a first adjusting groove each spaced out at a predetermined distance; a resilience member inserted via the fixation ring of the control rod and a washer; and a coupling part where the control rod is fixedly coupled thereunder to an insertion hole; and wherein the base part comprises: a round body; a horizontal part protrusively formed at an upper side of the body; a first groove part threadedly coupled by the first cylinder; a second groove part threadely coupled by the second cylinder; a third groove part fixedly inserted by the coupling part; a fourth groove part mounted with the third cylinder; a first check valve protrusively formed at one lateral surface of the first groove part; a first passage formed between the first groove part and the first check valve; a second passage formed between the first groove part and the second groove part; a second check valve formed inside the second passage; an oil control mechanism formed between a third passage formed between the second groove part and the third groove part and a fourth passage; and a fifth passage formed between the third groove part and a fourth groove part.

An oil hydraulic cylinder according to the present invention may comprise: a cap part protrusively formed thereon with a compression means for forcibly generating oil pressure, operation means fixedly connected to an object for lifting, stopping and lowering the object and adjusting means for controlling the lifting, stopping and lowering of the object; a body part connected inside a body case to the compression means, the operation means and the adjusting means and formed with a plurality of cylinders and pistons for carrying out an oil pressing operation; a base part coupled underneath the body part and formed therein with a predetermined flow route; an oil control part for controlling oil flowing in an oil route formed inside the base part; and manipulating means disposed at one side of the cap part for simultaneously controlling the compression means, the operation means and the adjusting means.

BRIEF DESCRIPTION OF THE DRAWINGS

For fuller understanding of the nature and objects of the present invention, reference should be made to the following detailed description taken in conjunction with the accompanying drawings in which:

FIGS. 3 to 12 are drawings for illustrating a first embodiment of the present invention wherein:

FIG. 3 is a coupled perspective view for illustrating an oil hydraulic cylinder;

FIG. 6 is a plan view for illustrating a base part;

FIG. 7 is a sectional view for illustrating a cap part;

FIG. 9 is an inner plan view for illustrating the base part of FIG. 6;

FIG. 10 is a sectional view for illustrating a mounted state of an oil control mechanism;

FIG. 11 is a schematic constitutional view for illustrating an oil hydraulic cylinder;

FIG. 15 to FIG. 21*b* are schematic views for illustrating a fourth embodiment of the present invention wherein:

FIG. 16 is an exploded perspective view for illustrating an oil hydraulic cylinder except for a body case and a base part;

FIG. 17 is an inner plan view for illustrating a base part;

FIG. 18 is a sectional view for illustrating a mounted state of an oil control mechanism;

FIG. 19 is a schematic constitutional view for illustrating an oil hydraulic cylinder;

FIG. 20 is a sectional view of principal parts for illustrating an oil bypassing when an operation rod reaches an uppermost end of a third cylinder;

FIGS. 21*a* and 21*b* are plan views for illustrating a state where an adjusting rod moves in cooperation when an adjusting lever is laterally manipulated in an oil hydraulic cylinder;

DETAILED DESCRIPTION OF THE INVENTION

Now, a first embodiment of the present invention will be described in detail with reference to the accompanying FIGS. 3 to 12*c*.

Figure 1:
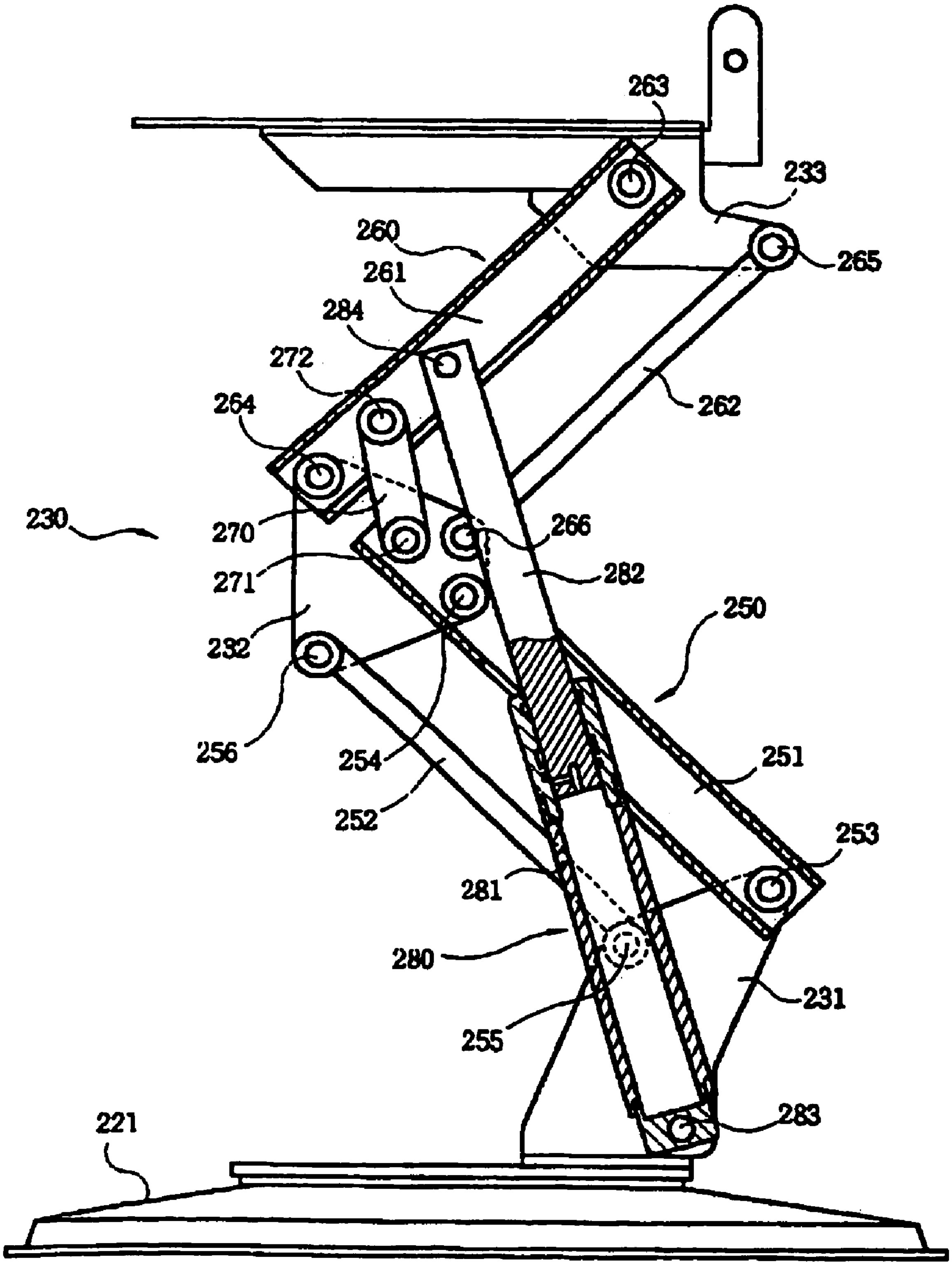
FIG. 1 Prior Art
FIG. 1 is a sectional view for illustrating a lifted state of a lifting mechanism combined with an oil hydraulic cylinder and a parallel link according to the prior art.
Figure 2:
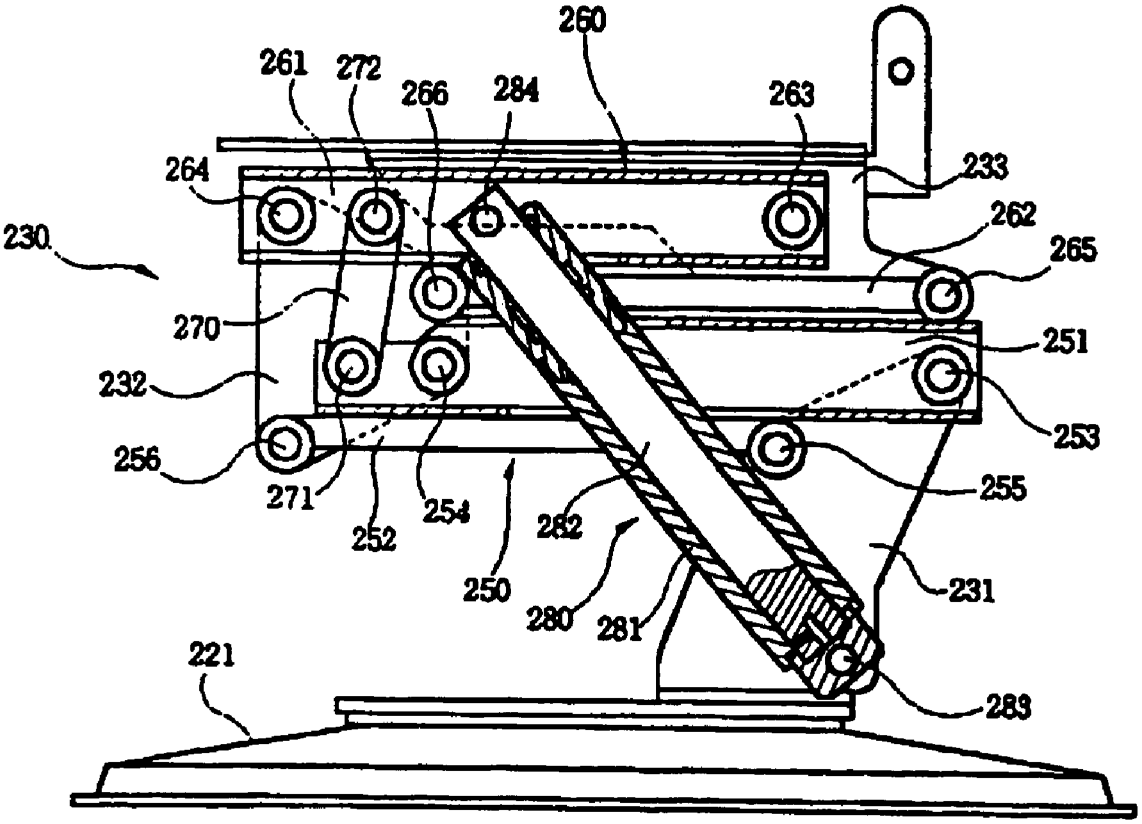
FIG.2 Prior Art
FIG. 2 is a sectional view for illustrating a lowered state of a lifting mechanism combined with an oil hydraulic cylinder and a parallel link according to the prior art.
Figure 3:
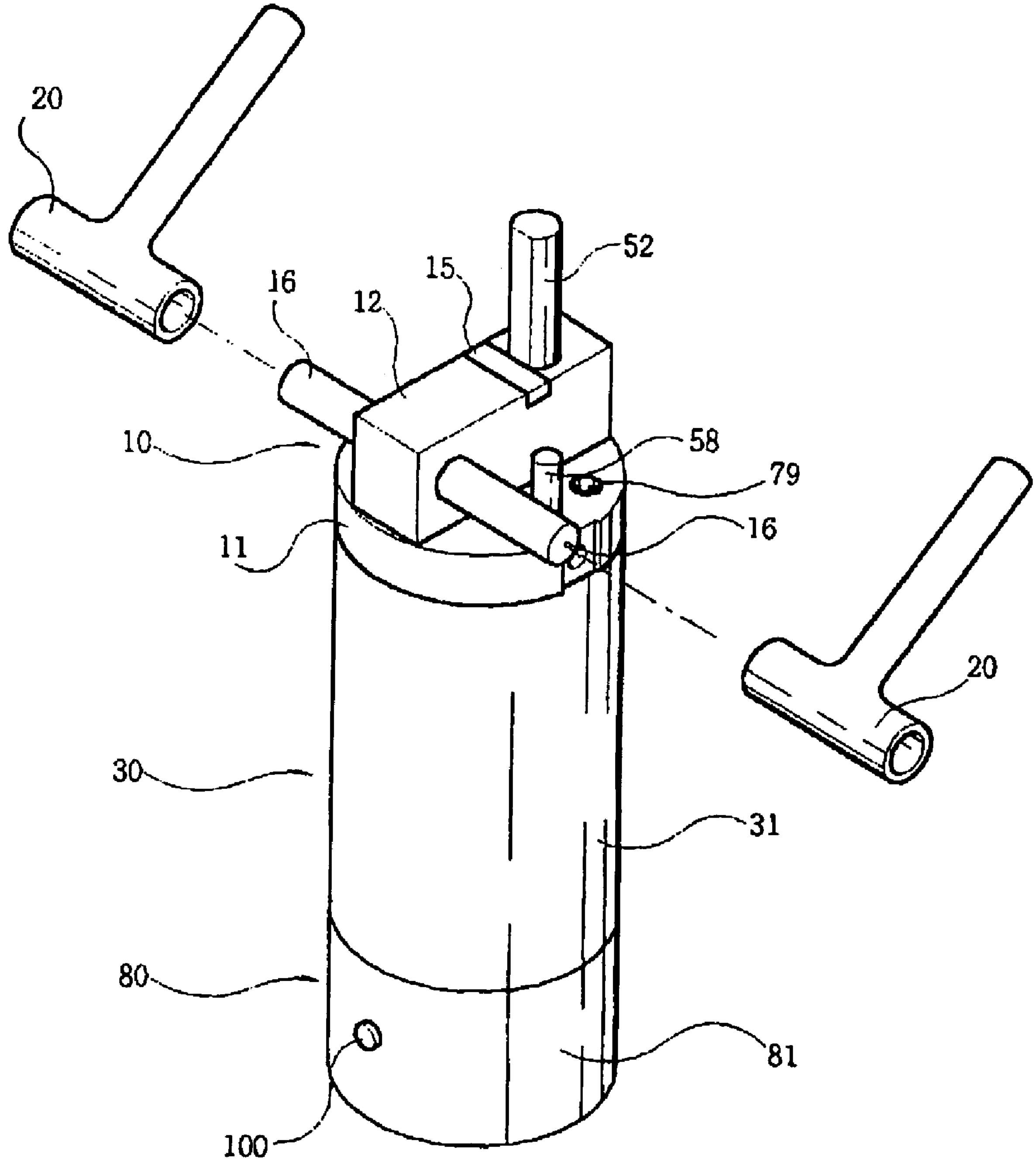
Figure 4A:
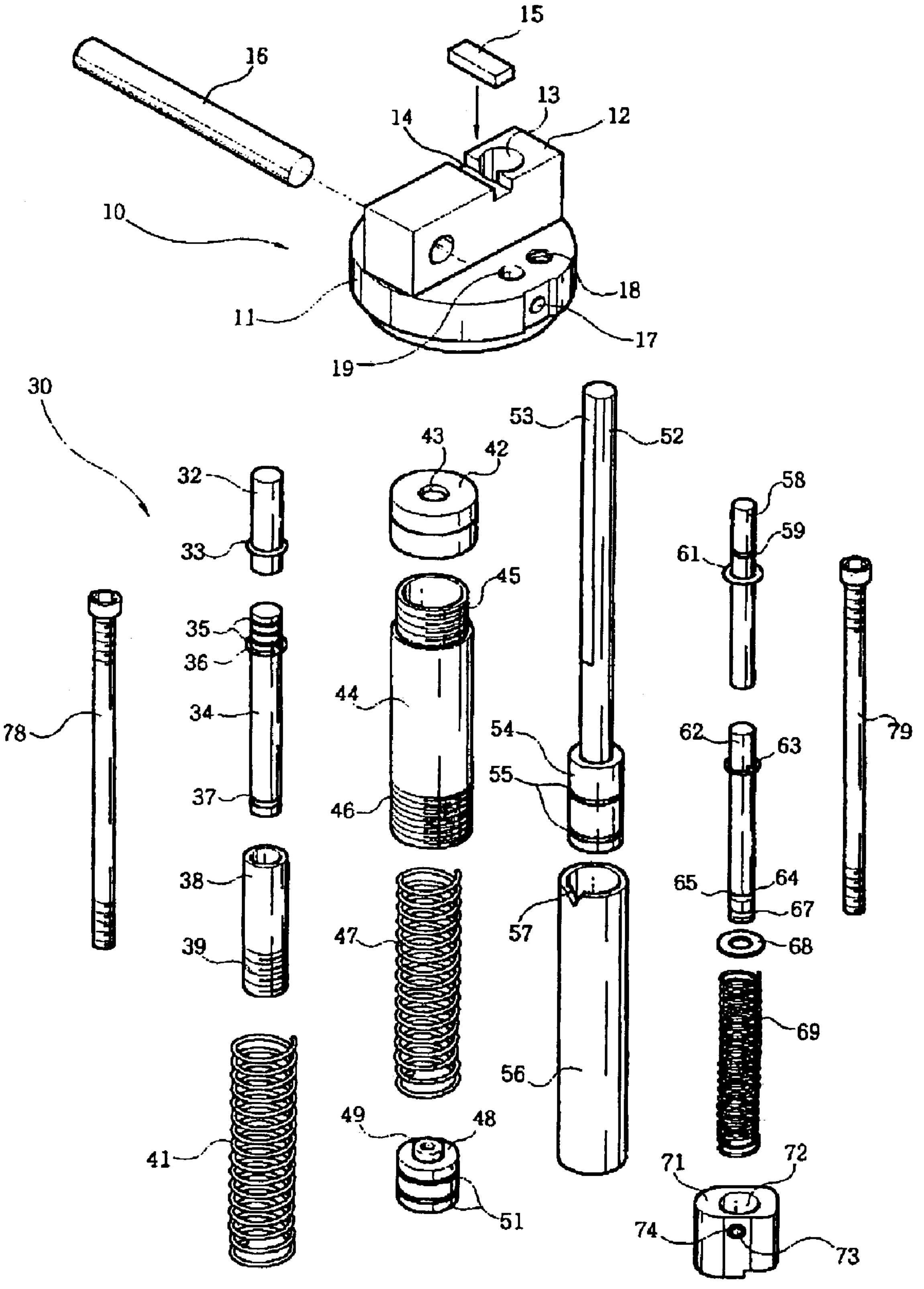
FIGS. 4*a* and 4*b* are exploded perspective views for illustrating an oil hydraulic cylinder.

As illustrated in FIGS. 3 and 4*c*, an oil hydraulic cylinder according to the first embodiment of the present invention includes a compression rod 32 for forcibly generating the oil pressure; a cap part 10 protrusively formed thereon with an operation rod 52 and an adjusting rod 58 wherein the operation rod 52 is fixedly interconnected to an object for lifting, stopping and lowering the same and the adjusting rod 58 controls the lifting, stopping and lowering of the object; a body part 30 connected inside a body case 31 to the compression rod 32, the operation rod 52 and the adjusting rod 58 and formed with a plurality of cylinders and pistons for carrying out an oil pressing operation; a base part 80 formed with an oil control part 100 coupled underneath the body part 30 and formed therein with a predetermined flow route and for controlling oil flowing in the flow route.

In other words, the cap part 10 is a stopper-shaped cap 11 formed with a rectangular support part 12 thereon, and through an upper side of the support part 12, there is provided an operation hole 13 through which an operation rod 52 is protruded. The operation hole 13 is formed at one side thereof with a rectangular hitching groove 14 into which a hitching piece 15 is insertedly coupled. The support part 12 is fixedly mounted at both distal end sides thereof with hinge rods 16.

Figure 5A:
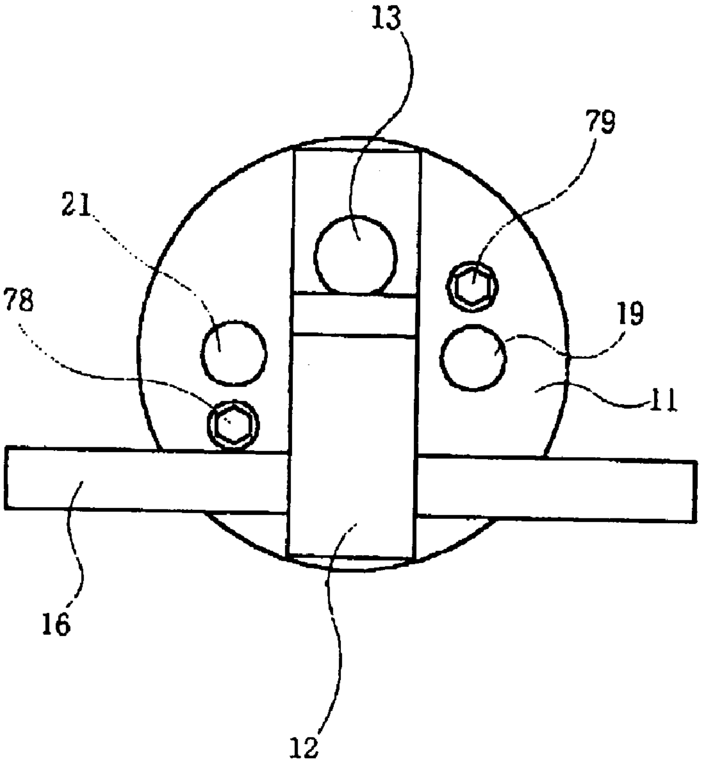
FIGS. 5*a* and 5*b* are a plan view and a bottom view for illustrating a cap part at an oil hydraulic cylinder.
Figure 5B:
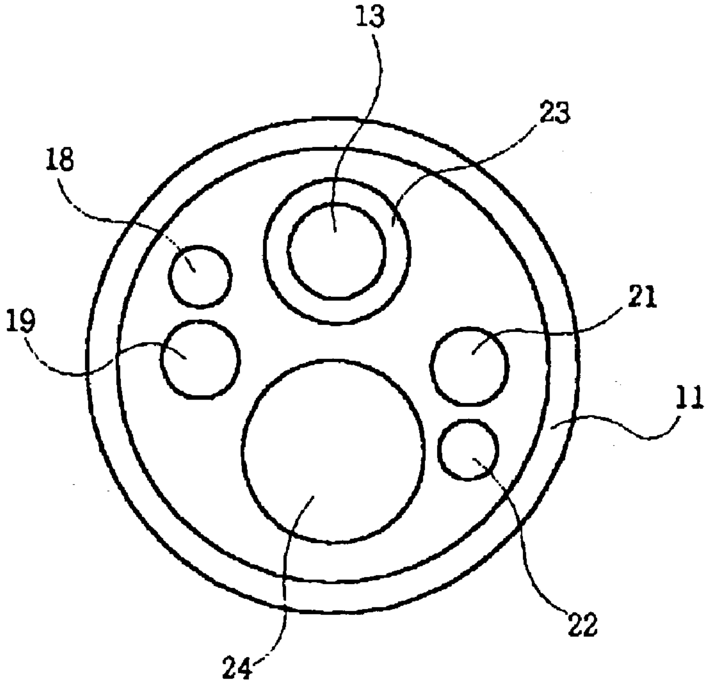

The cap 11 is formed thereon with an adjusting rod 19 through which the adjusting rod 58 is protruded, a compression hole 21 through which the compression rod 32 is protruded and two opposite coupling holes 18 and 22, as shown in FIG. 5*b*. The hinge rods 16 are respectively insertedly coupled with rotatable adjusting levers 20 and by the rotation of the adjusting levers 20, the compression rod 32 and the adjusting rod 58 are respectively controlled (pressed). A cut-out surface 53 at the operation rod 52 is abutted by the hitching surface 15 to prevent the operation rod 52 from being rotated when it is lifted or lowered.

Figure 7:
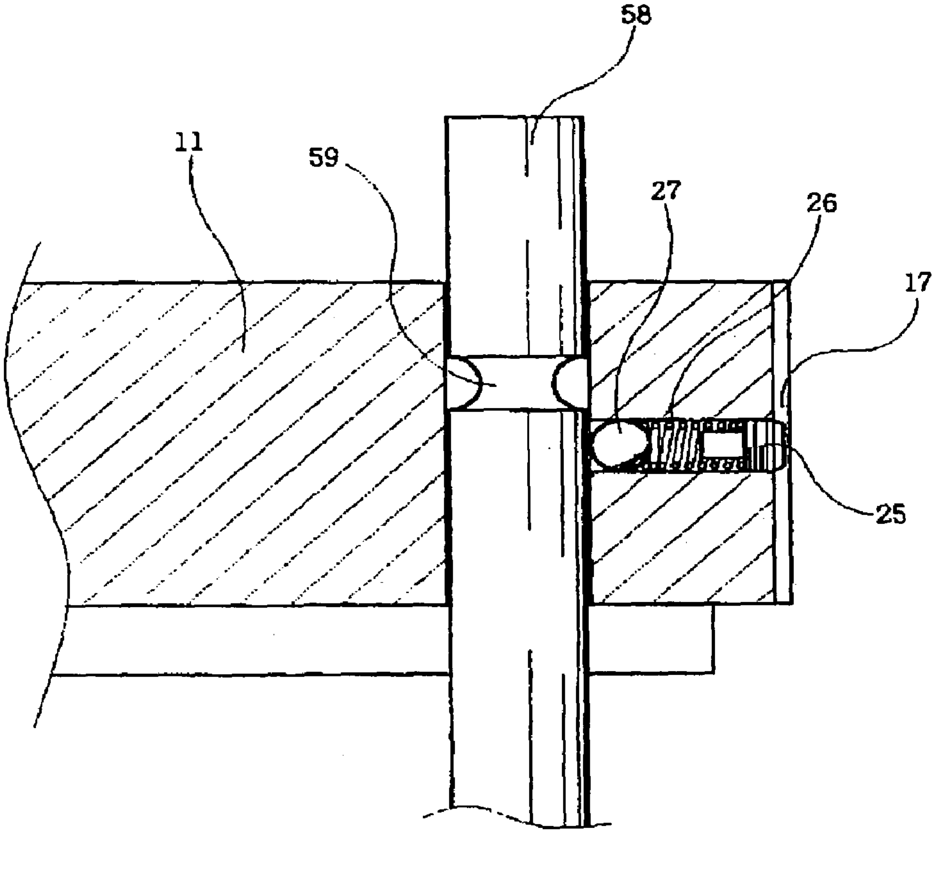

The cap 11 formed with the adjusting hole 19 is circumferentially mounted with an adjusting part 17. As illustrated in FIG. 7, the adjusting part 17 is formed with the cap 11 mounted at a lateral surface thereof with a hole (no reference numeral) through which a ball 27 and a spring 26 are inserted, and coupled by a bolt 25, such that a hitching groove 59 at the adjusting rod 58 is hitched by the ball 27, pressure of which is in turn controlled by the bolt 25.

As shown in FIG. 5*b*, the cap 11 is formed at a bottom surface thereof with a moving groove 23 having a diameter larger that that of the operation hole 13 to allow a third cylinder 56 to be inserted thereinto, and is also formed with a groove part 24 having a relatively larger diameter to allow a cap 42 of a second cylinder 44 to be positioned thereat.

Meanwhile, the body part 30 is formed with a body case 31 in which a plurality of cylinders and pistons are situated. First of all, the compression rod 32 that is inserted into a compression hole 21 of the cap 11 is mounted at a lower circumference thereof with a fixation ring 33. The compression rod 32 is also mounted thereunder with a first piston 34 which is in turn formed at an upper circumference thereof with a plurality of O-rings 35 and a fixation washer 36, and at a lower circumference thereof with an O-ring 37, a first cylinder 38 into which the first piston 34 is inserted and formed at a lower circumference thereof with a threaded part 39, and a resilience member 41 which is inserted outside of the first cylinder 38 and hitched at one side thereof by the fixation washer 36 of the first piston 34. In the structure thus described, the first piston 34 is moved by the lifting operation of the compression rod 32 to thereby generate the oil pressure.

A groove part 24 at the cap 11 is inserted by a cap 42 formed with an opening 43 to which there is provided a second cylinder 44 coupled via the cap 42 and the threaded part 45, a resilience member 47 inserted into the second cylinder 44 and a first piston pad 48 insertedly mounted at the second cylinder 44 for applying pressure to the resilience member 47. The first piston pad 48 is formed thereon with a head part 49 and also formed at a circumference thereof with a plurality of O-rings 51.

The operation rod 52 inserted into the operation hole 13 at the cap 11 is defined at one side thereof with the cut-out surface 53 of a predetermined length, and is formed thereunder with a second piston pad 54 mounted with a plurality of O-rings and is disposed thereon with a third cylinder 56 having a V-shaped cut-out part 57.

The operation rod 58 inserted into the adjusting hole 19 of the cap 11 is formed at a top mid-section thereof with a hitching groove 59 and at a central section thereof with a fixation ring 61. The operation rod 58 is equipped thereunder with a control rod 62 which is fixedly disposed thereon with a fixation ring 63 and formed thereunder with a second adjusting groove 64 and a first adjusting groove 67, each spaced at a predetermined interval. The control rod 62 is inserted by a resilience member 69 via a fixation ring 63 and a washer 68 and is inserted thereunder into an insertion hole 72 of the coupling part 71.

Figure 12A:
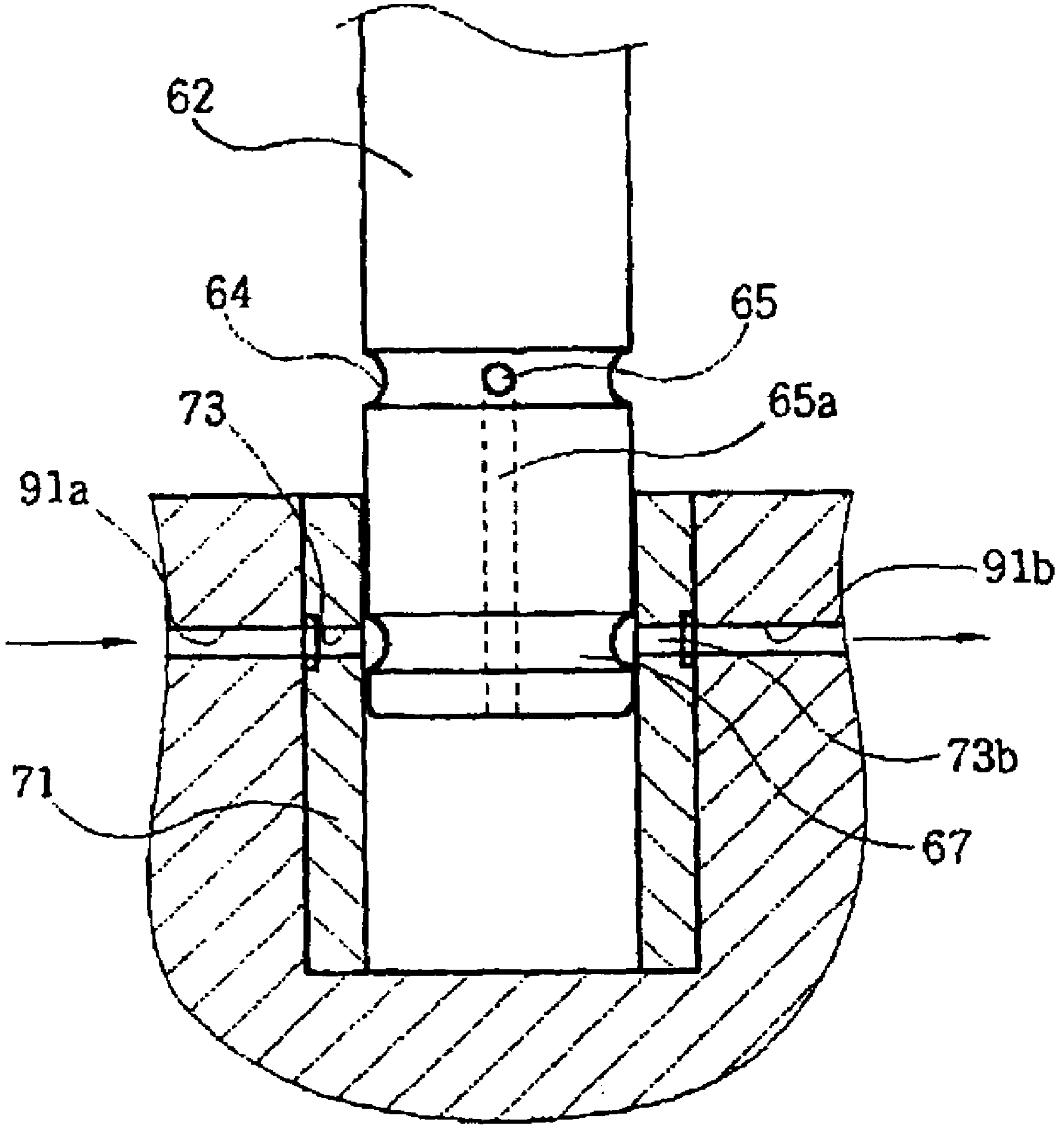
FIGS. 12*a* to 12*c* are sectional views of principal parts in a control rod for illustrating operation of an oil hydraulic cylinder.

As illustrated in FIG. 12*a*, the control rod 62 is formed with a second adjusting groove 64 equipped with a horizontal through hole 65, which is in turn connected thereunder to a vertical through hole 65*a* via a central inside of the control rod 62.

Figure 8A:
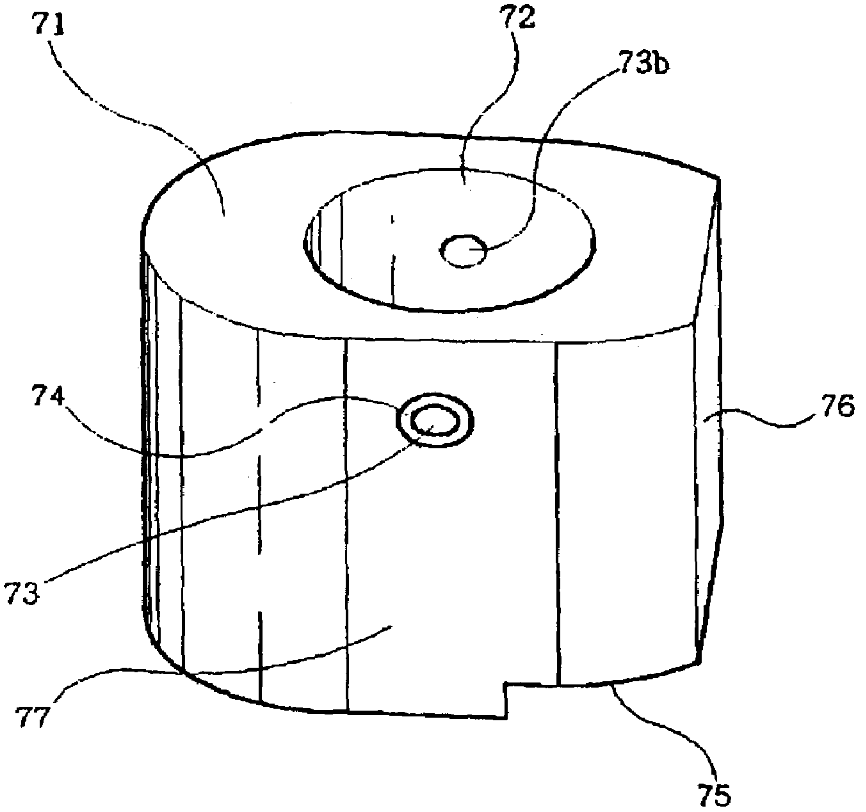
FIGS. 8*a* and 8*b* are a perspective view and a side sectional view for illustrating a coupled part.
Figure 8B:
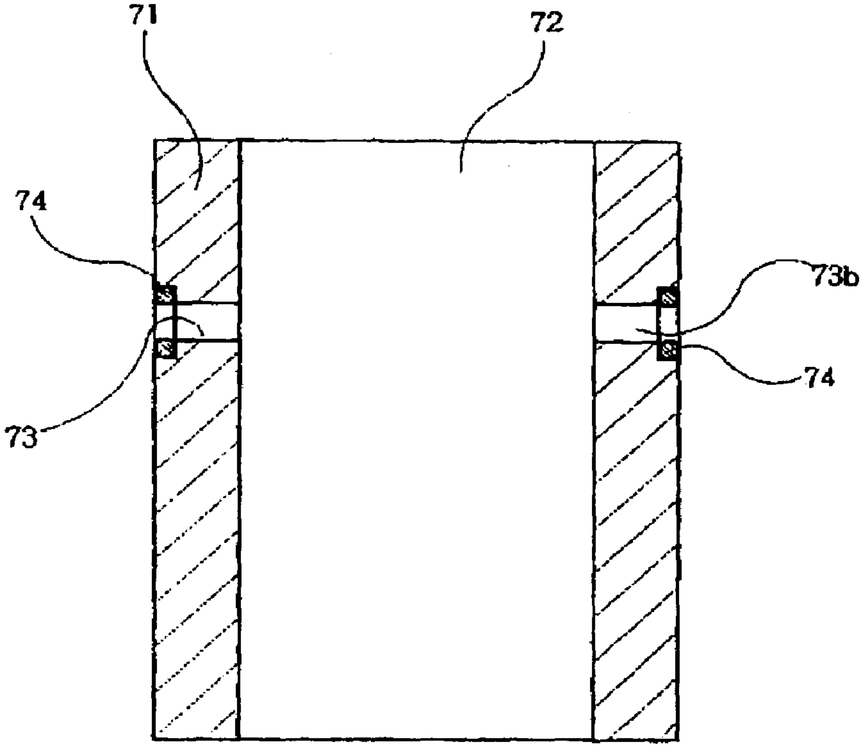

As shown in FIGS. 8*a* and 8*b*, the oval-pillar shaped coupling part 71 is formed with an insertion hole 72 into which the control rod 62 is inserted and cutout parts 76 and 77. The cut-out parts 77, which are formed at both sides of the coupling part 71, are formed thereon with an inlet 73 and an outlet 73*b*, around which there are respectively formed O-rings 74.

Furthermore, the cut-out part 76 at one side of the coupling part 71 is formed with an incised part 75 for use as an oil groove.

Figure 4B:
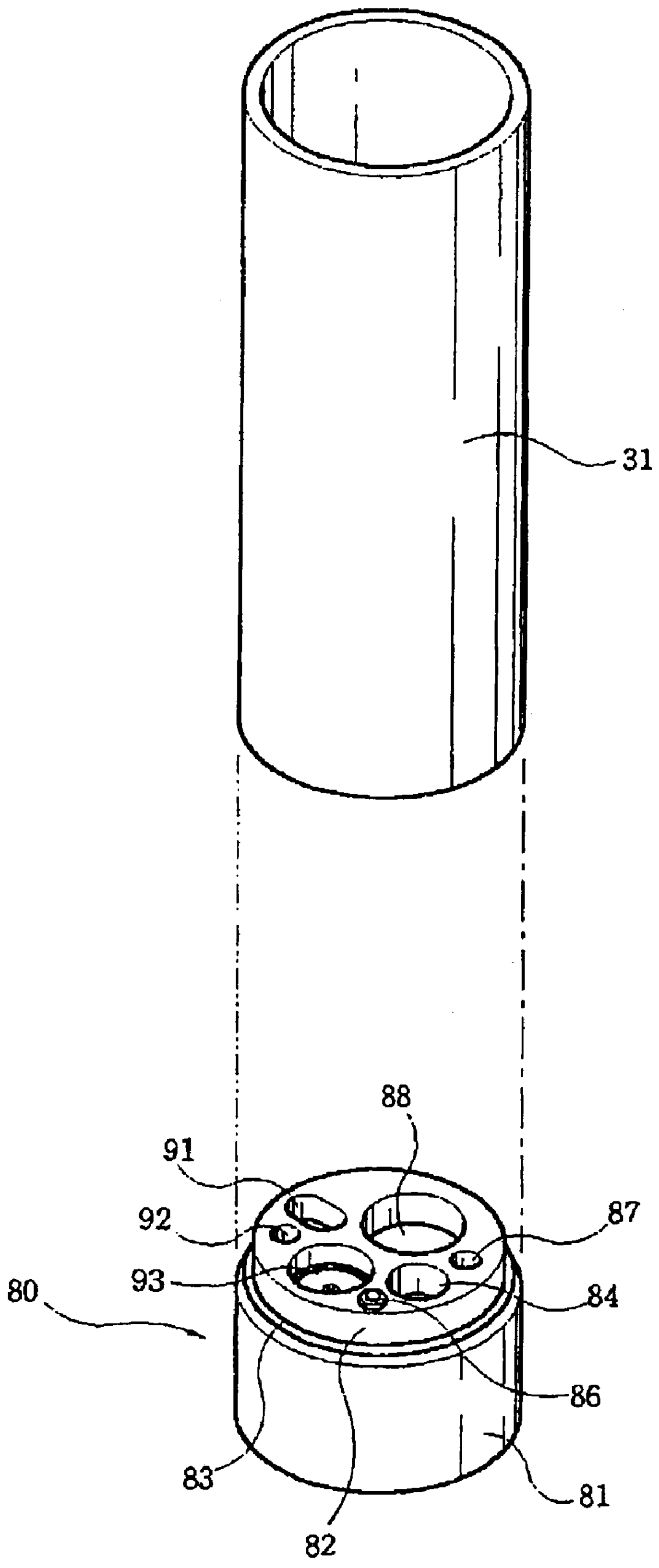
Figure 6:
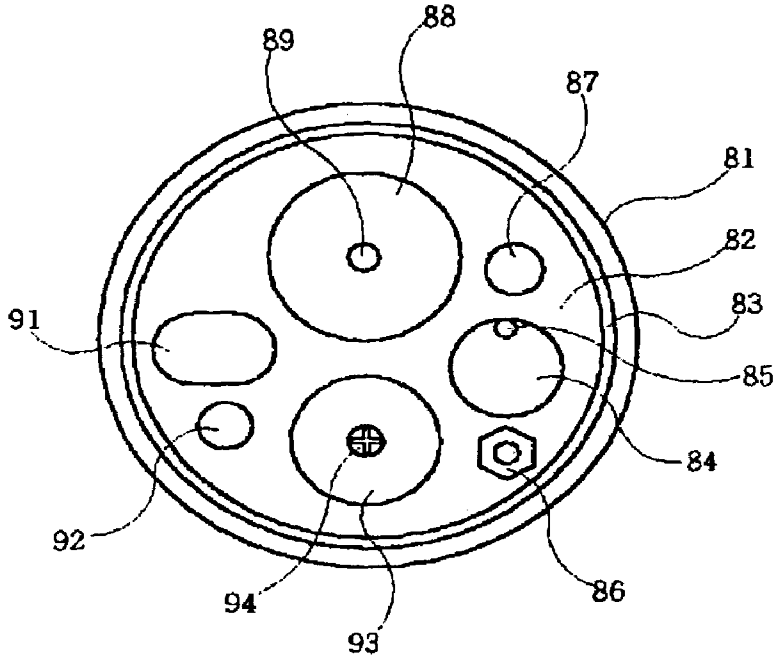
Figure 9:
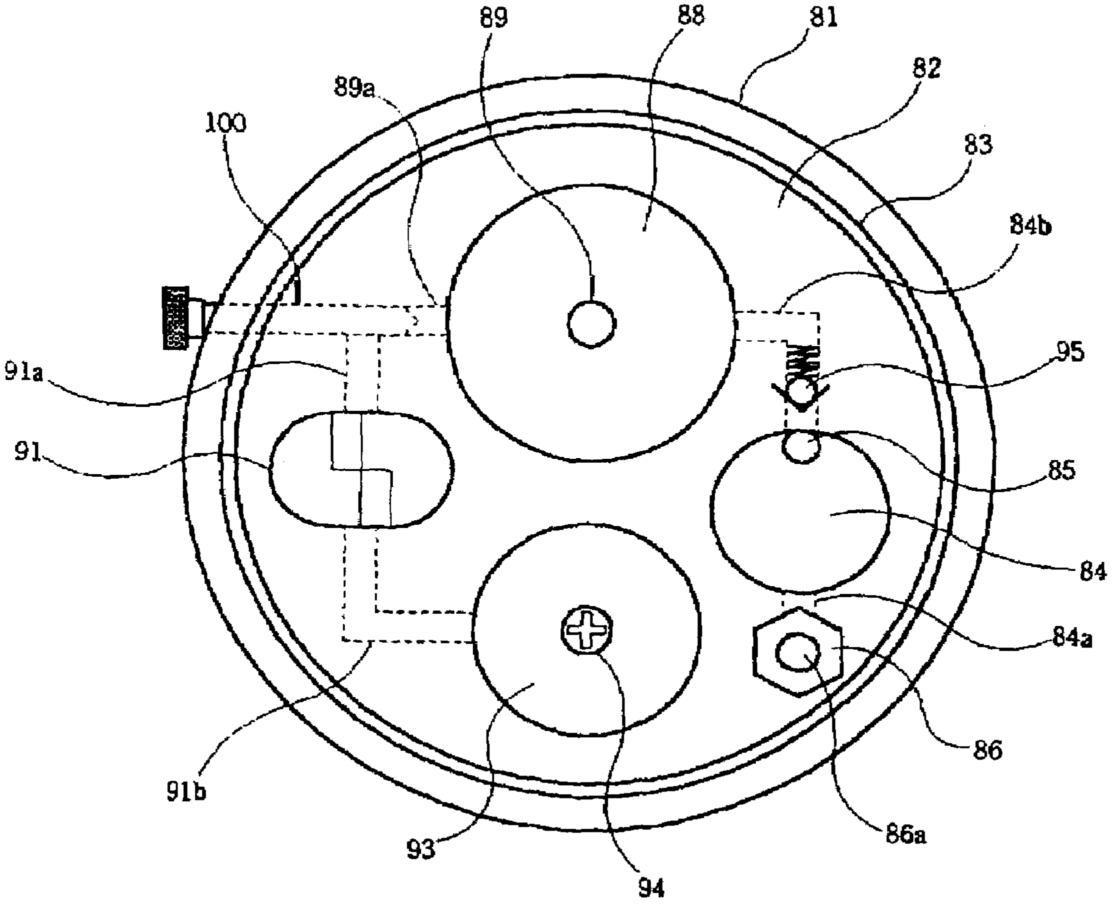

The base part 80 includes a cylindrical body 81, a horizontal part 82 protrusively formed on the body 81, an O-ring 83 disposed between the body 81 and the horizontal part 82 and an oil control mechanism 100 insertedly formed at a lateral surface of the body 81, as depicted in FIGS. 4*b*, 6 and 9.

The horizontal part 82 is formed with a first groove part 84 screwed by the first cylinder 38, a second groove part 88 screwed by the second cylinder 44, a third groove part 91 fixedly inserted by the coupling part 71 and a fourth groove part 93 mounted with the third cylinder 56.

The horizontal part 82 includes a first check valve 86 protrusively disposed at one lateral surface of the first groove part 84 and coupled holes 87 and 92, each oppositely formed for being screwed with the coupled rods 78 and 79.

The first groove part 84 formed with an outlet 85 is connected to the first check valve 86 via a first passage 84*a*. The first check valve 86 is mounted with an inlet hole 86*a*. A second passage 84*b* formed between the first groove part 84 and the second groove part 88 is disposed with a second check valve 95.

The second groove part 88 is formed with an inlet/outlet 89, and between a third passage 89*a* formed between the second groove part 88 and the third groove part 91 and fourth passage 91*a* there is disposed the oil control mechanism 100. Between the third groove part 91 and a fourth groove part 93 there is formed a fifth passage 91*b* and the fourth groove part 93 is provided with an outlet hole 94.

Figure 10:
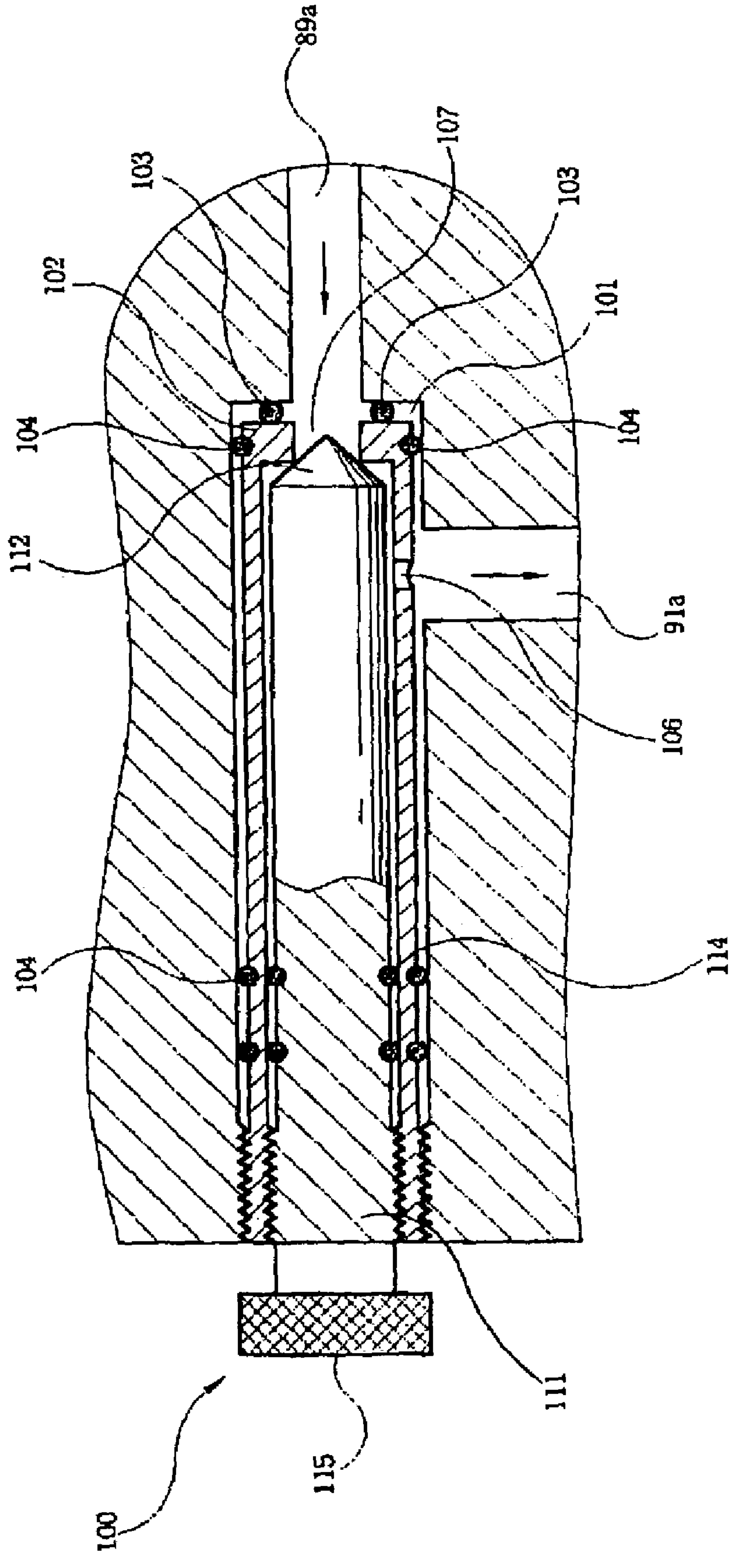

The oil control mechanism 100 for controlling the oil flowing from the third passage 89*a* to the fourth passage 91*a* is formed with a passage part 101 having a diameter larger than that of the third passage 89*a* as shown in FIG. 10, and is formed at a distal end portion thereof with an opening 107, where a tube 102 formed with an outlet 106 is inserted into the passage part 101 for a threaded coupling.

The tube 102 is threaded into by a pin rod 111 formed at a distal end portion thereof with an adjusting pinnacle 112 and formed at a rear part thereof with a handle 115. The oil introduced from the third passage 89*a* is controlled via the adjusting pinnacle 112 by the handle 115 such that the oil is discharged to the fourth passage 91*a* via the outlet 106.

Furthermore, a plurality of O-rings 103, 104 and 114 are disposed between the tube 102 and the body 81, and between the pin rod 111 and the tube 102 for sealing the passage part.

Now, operation of the oil hydraulic cylinder thus constructed according to the first embodiment of the present invention is described.

Figure 11:
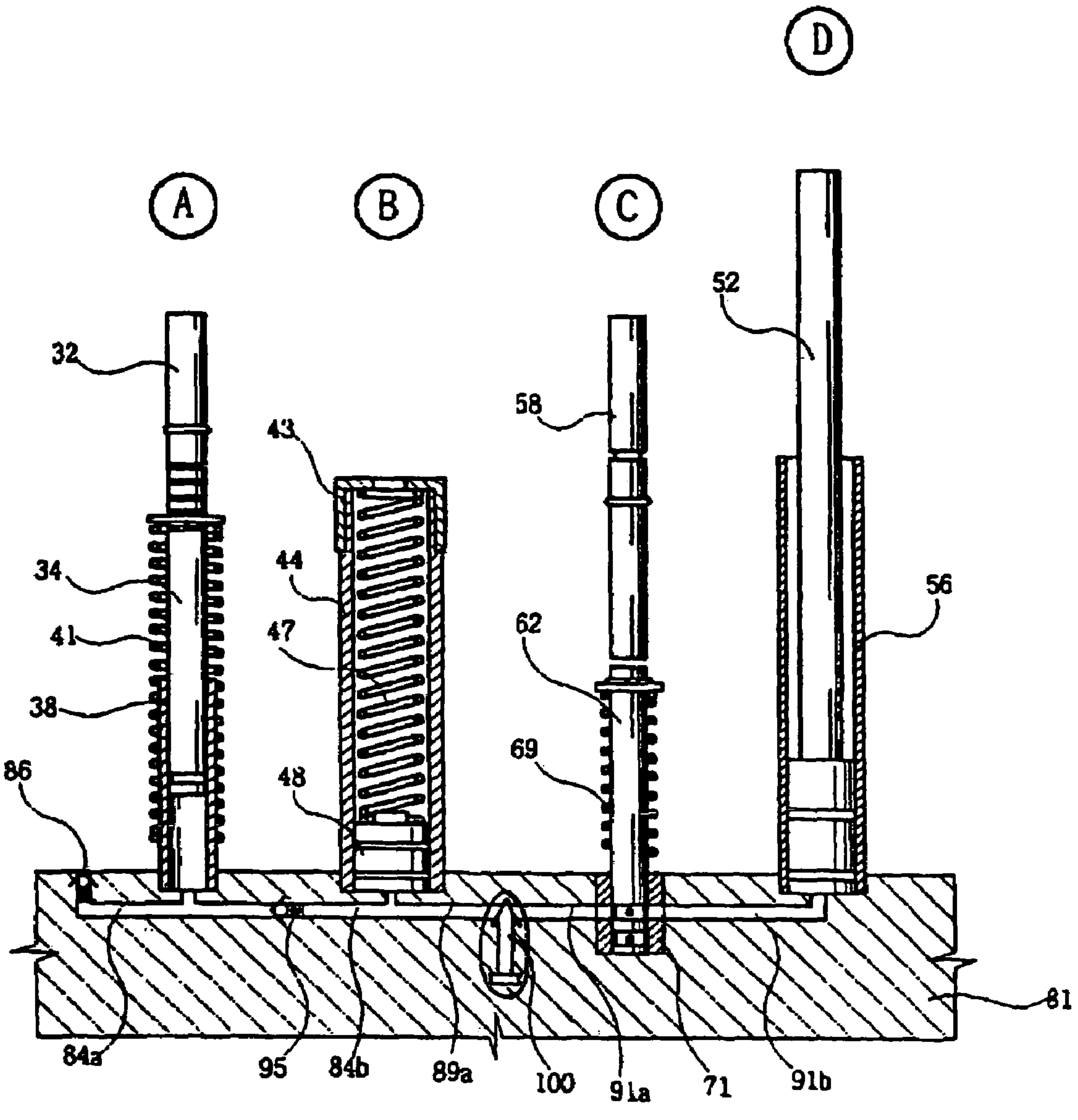

FIG. 11 is a schematic structural view for illustrating an oil hydraulic cylinder, where (A) part describes the compression rod 32, the first piston 34 and the first cylinder 38. When the compression rod 32 is pressed, the first piston 34 descends to shut off the first check valve 86 and simultaneously to open the second check valve 95, whereby the oil flows only through the second passage 84*b*. When the first piston 34 ascends the first check valve is opened to allow the oil filled inside the body case 31 to be introduced, and at the same time the second check valve 95 is shut off to prevent the oil in the second passage 84*b* from flowing backward.

(B) part describes the construction of the second cylinder 44 and the first piston pad 48. The first piston pad 48 is lifted by the oil introduced via the second passage 84*b*, whereby the oil flows into the second cylinder 44 and simultaneously flows into (C) part which is defined with the coupling part 71 and the control rod 62 via the third passage 89*a*, the oil control mechanism 100 and the fourth passage 91*a*.

When the first piston pad 48 ascends in response to compression of the first piston 34 at the (A) part, the (B) part presses the resilience member 47 inside the second cylinder 44, and when the first piston 34 is released, the first piston pad 48 descends in response to resilience of the resilience member 47.

As a result, the first piston pad 48 of the second cylinder 44 sends the oil to the third passage 91*a* during both the compression and the release of the first piston 34, thereby providing a smooth operation when an object is lifted.

The oil control mechanism 100 serves to control the oil (pressure) flowing from the third passage 89*a* to the fourth passage 91 a, where it is very important to control the oil. The reason of importance is that energy accumulated at the second cylinder 44 via the first piston pad 48 differs in response to the oil introduced into the fourth passage 91*a* from the third passage 89*a*, such that when the oil control mechanism 100 is adjusted to allow the oil to flow in less quantity, most of the oil flows into the second cylinder 44 via the second passage 84*b*, and when the oil control mechanism 100 is adjusted to allow the oil to flow in more quantity, most of the oil flows into the third passage 89*a* and the fourth passage 91 a via the second passage 84*b*.

Furthermore, as illustrated in FIG. 10, the control of the oil control mechanism 100 is effected out by manipulation of the handle 115 to adjust a gap between the adjusting pinnacle 112 of the pin rod 111 and the opening 107 of the tube 102.

The (C) part carries out operations such as lifting, stopping and lowering the operation rod 52 at (D) part in response to manipulation of the control rod 62 operated in three stages by the adjusting rod 58 and the coupling part 71. By these operations, an oil route where oil flows from the third passage 91*a* to the fourth passage 91*b* is controlled.

The (D) part including the operation rod 52 and the third cylinder 56 serves to effect the operations such as lifting, stopping and lowering of the operation rod 52 connected to an object in response to control of the oil introduced into the fourth passage 91*b*.

Figure 12B:
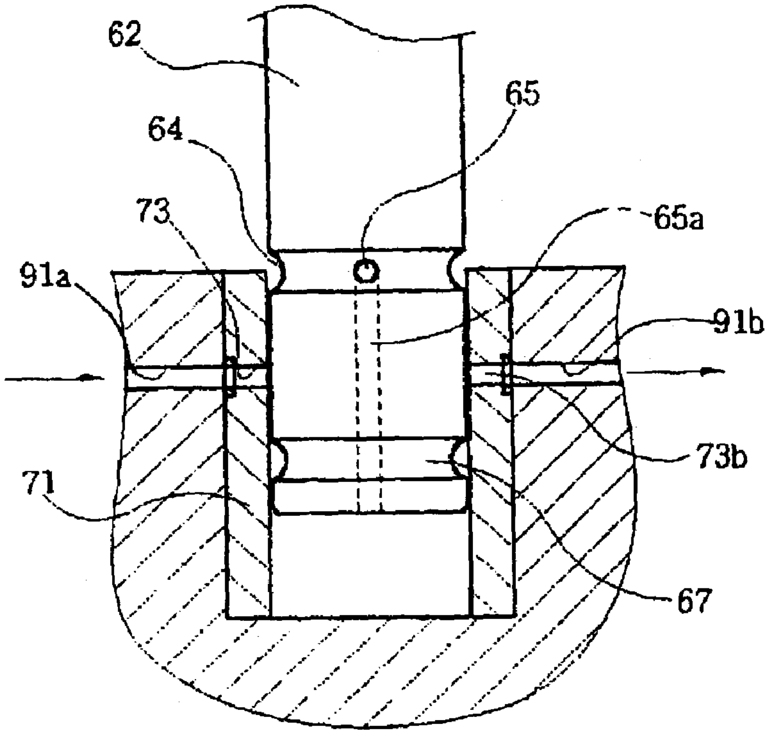

Now, operation of the oil hydraulic cylinder thus constructed according to the first embodiment of the present invention will be described with reference to FIGS. 12*a*, 12*b* and 12*c*.

First of all, when the operation rod 52 is lifted, the compression rod 32 repeats the pressure applying and releasing operations. At this time, the control rod 62 connected to the adjusting rod 58 is situated at an initial position such that the first adjusting groove 67 is positioned at the inlet 73 and the outlet 73*b* of the coupling part 71 as shown in FIG. 12*a*.

As a result, the oil inside the first cylinder 38 flows into the second cylinder 44 through the outlet 85 of the first groove part 84, the second check valve 95, the second passage 84*b*, and the inlet/outlet 89 of the second groove 88, and at the same time, the oil flows through the third passage 89*a*, the oil control mechanism 100, the fourth passage 91*a*, the inlet 73 of the coupling part 71, the first adjusting groove 67 of the control rod 62, the fifth passage 91*b*, the outlet 94 of the fourth groove part 93 and the third cylinder 56 to thereby lift the operation rod 52 of the third cylinder 56 when the first piston 34 descends in response to the pressure applied by the compression rod 32.

Furthermore, the oil filled inside the body case 31 is introduced into the first cylinder 38 via the first check valve 86 and the first passage 84*a* when the compression rod 32 is released to lift the first piston 34, and simultaneously the first piston pad 48 of the second cylinder 44 is compressed by the resilience of the resilience member 47, whereby the oil in the second cylinder 44 flows through the inlet/outlet 89 of the second groove 88, the third passage 89*a*, the oil control mechanism 100, the fourth passage 91*a*, the inlet 73 of the coupling part 71, the first adjusting groove 67 of the control rod 62, the fifth passage 91*b*, the outlet 94 of the fourth groove part 93 and the third cylinder to thereby lift the operation rod 52 of the third cylinder 56. As a result, the operation rod 52 is lifted during both the ascent and descent of the compression rod 32.

Next, the adjusting rod 58 is a little bit compressed in order to stop the operation rod 52. At this time, the hitching groove 59 of the adjusting rod 58 is hitched by the ball 27 of the adjusting part 17 as illustrated in FIG. 7, whereby the control rod 62 becomes positioned at a place as illustrated in FIG. 12*b*. At this time, the oil is stopped of its flow because the inlet 73 and the outlet 73*b* are shut off by the control rod 62. As a result, the operation rod 52 of the third cylinder 56 is stopped at the present state of the oil being shut off.

If the adjusting rod 58 is a little bit further compressed and released under the present state, the adjusting rod 58 is bounced up by the resilience of the resilience member 69, that is, the hitching groove 59 passes the ball 27, to be placed at an initial state of position as illustrated in FIG. 12*a*, allowing the operation rod 58 to keep effecting the lifting operation.

Figure 12C:
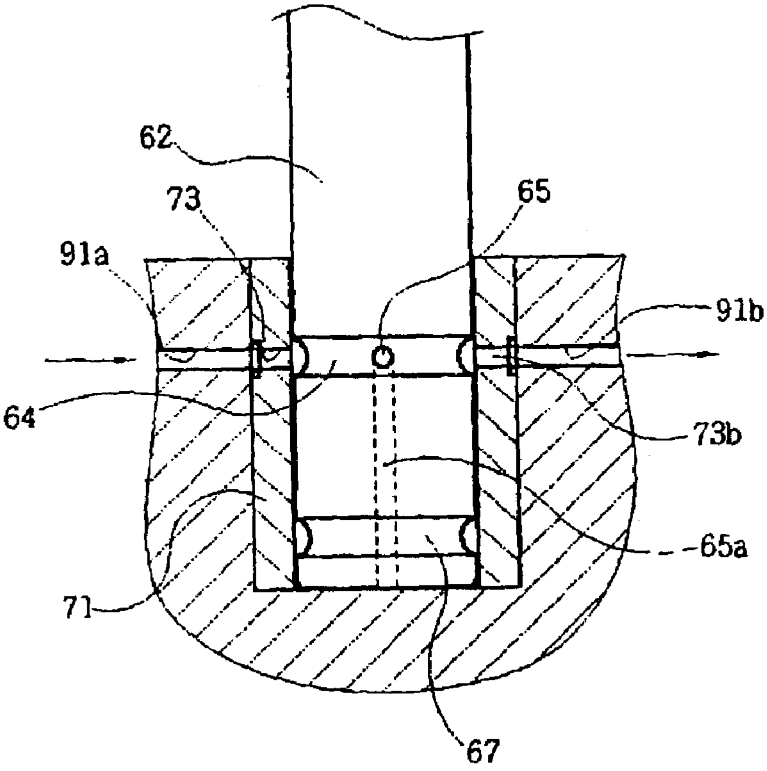

Meanwhile, when the operation rod 52 is to be descended, the adjusting rod 58 is completely depressed downwards to make the control rod 62 positioned at a place illustrated in FIG. 12*c*.

At this time, the oil coming from the fourth passage flows into the body case 31 via the second groove 64 of the control rod 62, the horizontal through hole 65, the incised part 75 of the coupling part 71 via the vertical through hole 65*a*, and the cut-out part 76 and at the same time, the oil filled in the third cylinder 56 flows backward via the fifth passage 91*b*. Likewise, the oil flows into the body case 31 via the second adjusting groove 64 of the control rod 62, the horizontal through hole 65, the vertical through hole 65*a*, the incised part 75 of the coupling part 71 and the cut-out part 76 to lower the operation rod 52.

Next, a second embodiment of the present invention will be described in detail with reference to FIG. 13. By way of reference, like reference numerals refer to similar or like elements or parts throughout the drawing, redundant explanation will be deleted.

Figure 13:
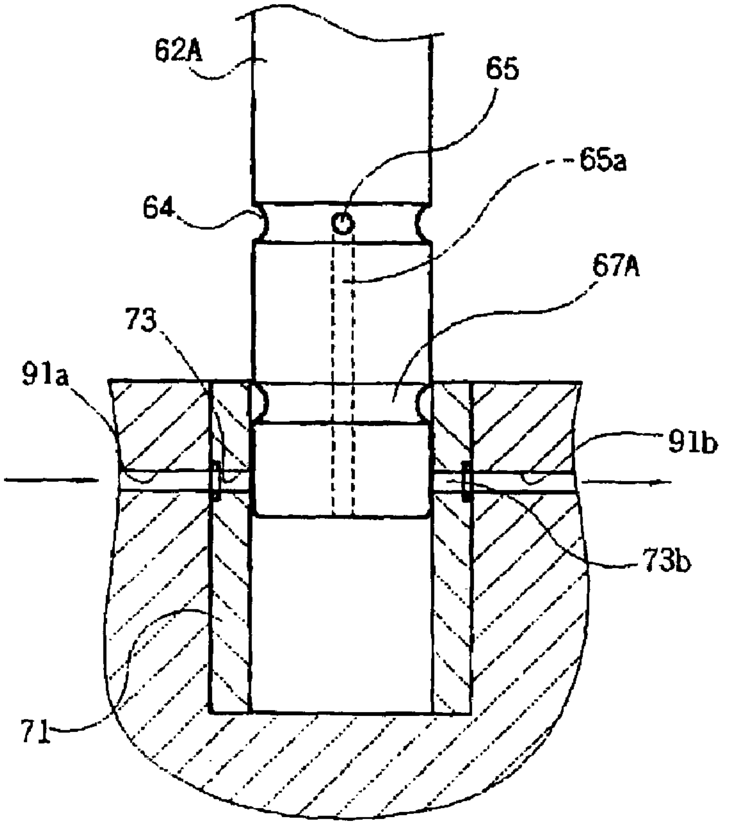
FIG. 13 is a sectional view of principal parts in a control part according to a second embodiment of the present invention.

As illustrated in FIG. 13, a control rod 62A in the second embodiment of the present invention is constructed in different structure.

In other words, the control rod 62A is defined with a first adjusting groove 67A right under the second adjusting groove 64 such that the operation rod 52 can be controlled in a different manner at each stage, like ‘stop’ at the initial stage, ‘ascent’ at the next stage and ‘descent’ at a following stage after the next. Operation and effect are the same as those of the first embodiment of the present invention.

Next, a third embodiment of the present invention will be described in detail with reference to FIG. 14. As in the second embodiment, like reference numerals refer to similar or like elements or parts and explanation thereto will be omitted.

Figure 14:
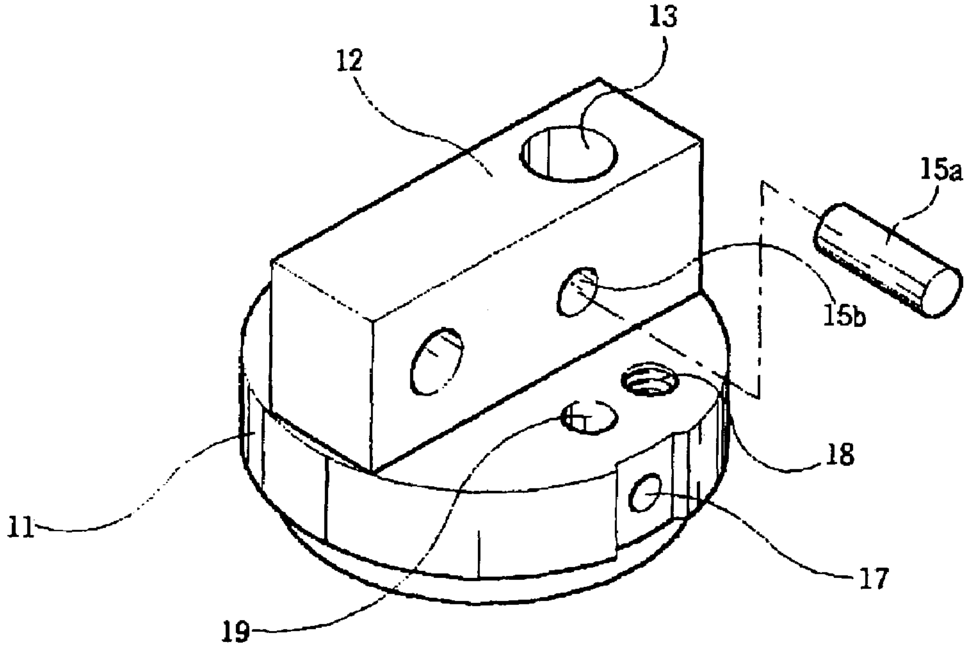
FIG. 14 is a perspective view for illustrating a cap part according to a third embodiment of the present invention.

FIG. 14 shows a pin 15*a* of a different structure and a pin hole 15*b* formed by piercing a lateral surface of a support part 12. In other words, the support part 12 may not be formed with a hitching hole 14 and a hitching piece 15 as in the first embodiment. Instead, the pin 15*a* may be inserted into the pinhole 15*b* to allow an operation hole 13 to abut on a cut-out surface 53 a vertically piercing operation rod 52. Operation and effect are the same as those of the first embodiment of the present invention.

Next, a fourth embodiment of the present invention will be described in detail with reference to FIGS. 15*a* through 21*b*. As in the previous embodiments, throughout the drawings, like reference numerals are used for designation of like or equivalent parts or portions for simplicity of illustration and explanation.

Figure 15A:
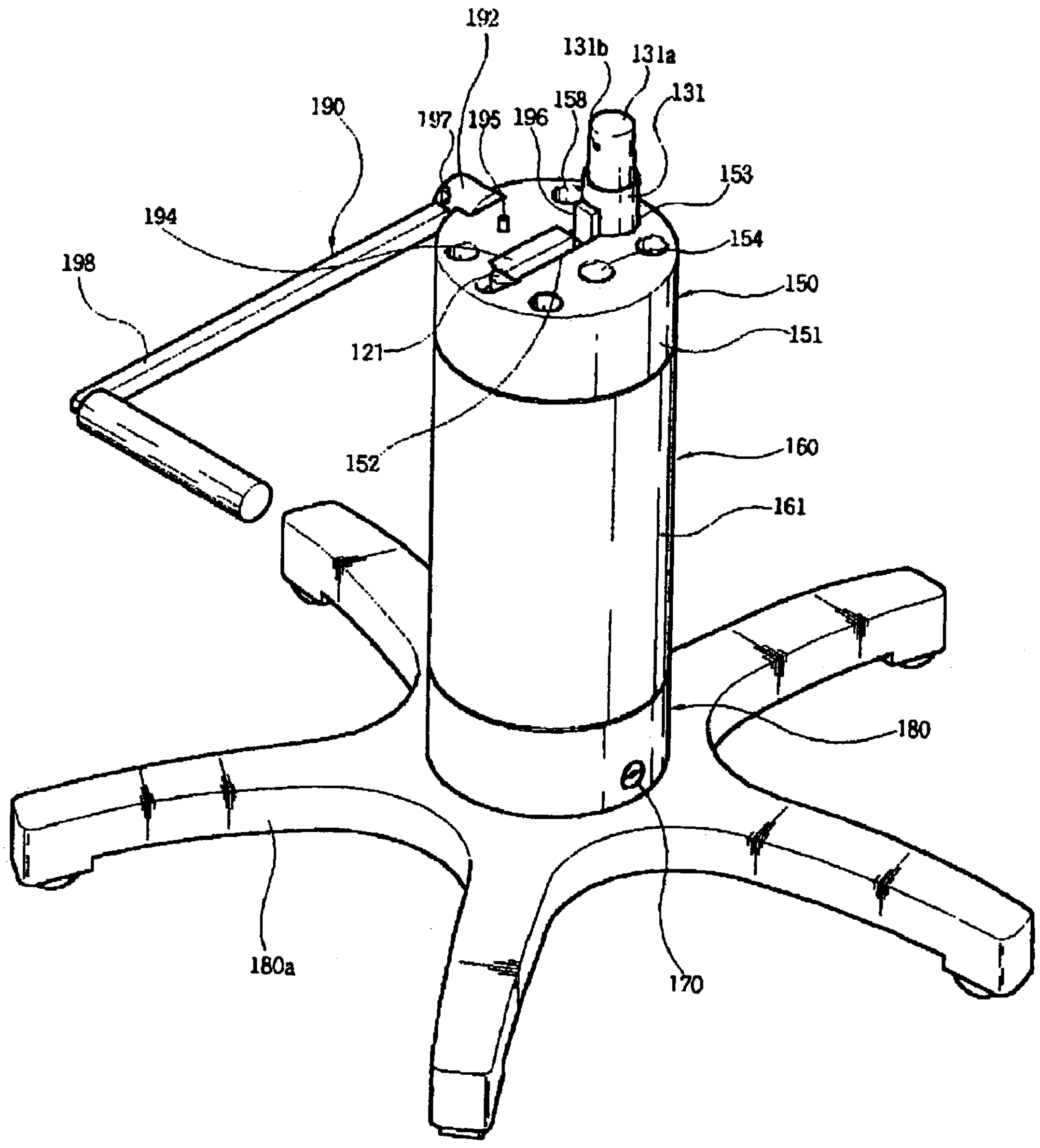
FIGS. 15*a* and 15*b* are perspective views for illustrating states before and after operation of an oil hydraulic cylinder.
Figure 15B:
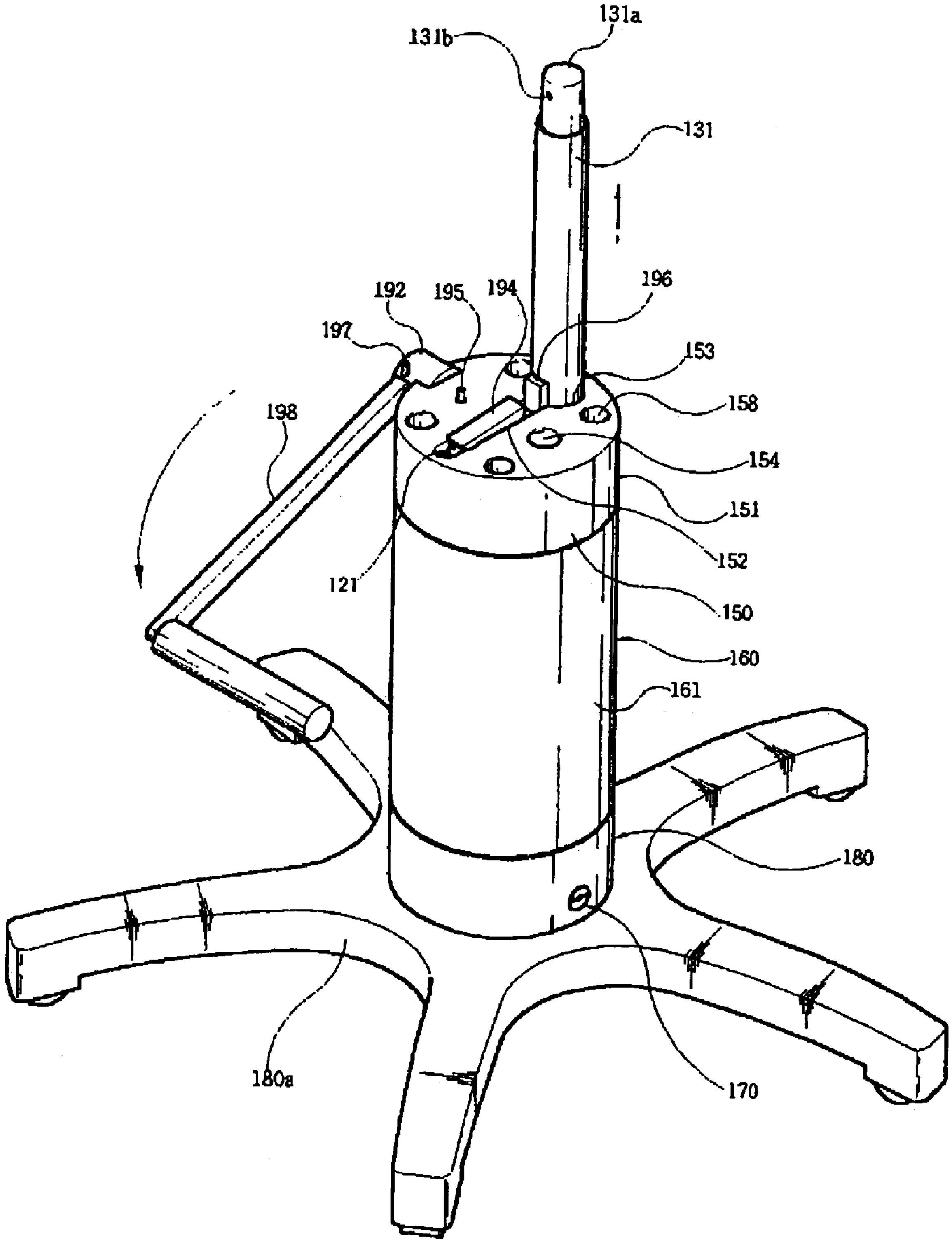
Figure 16:
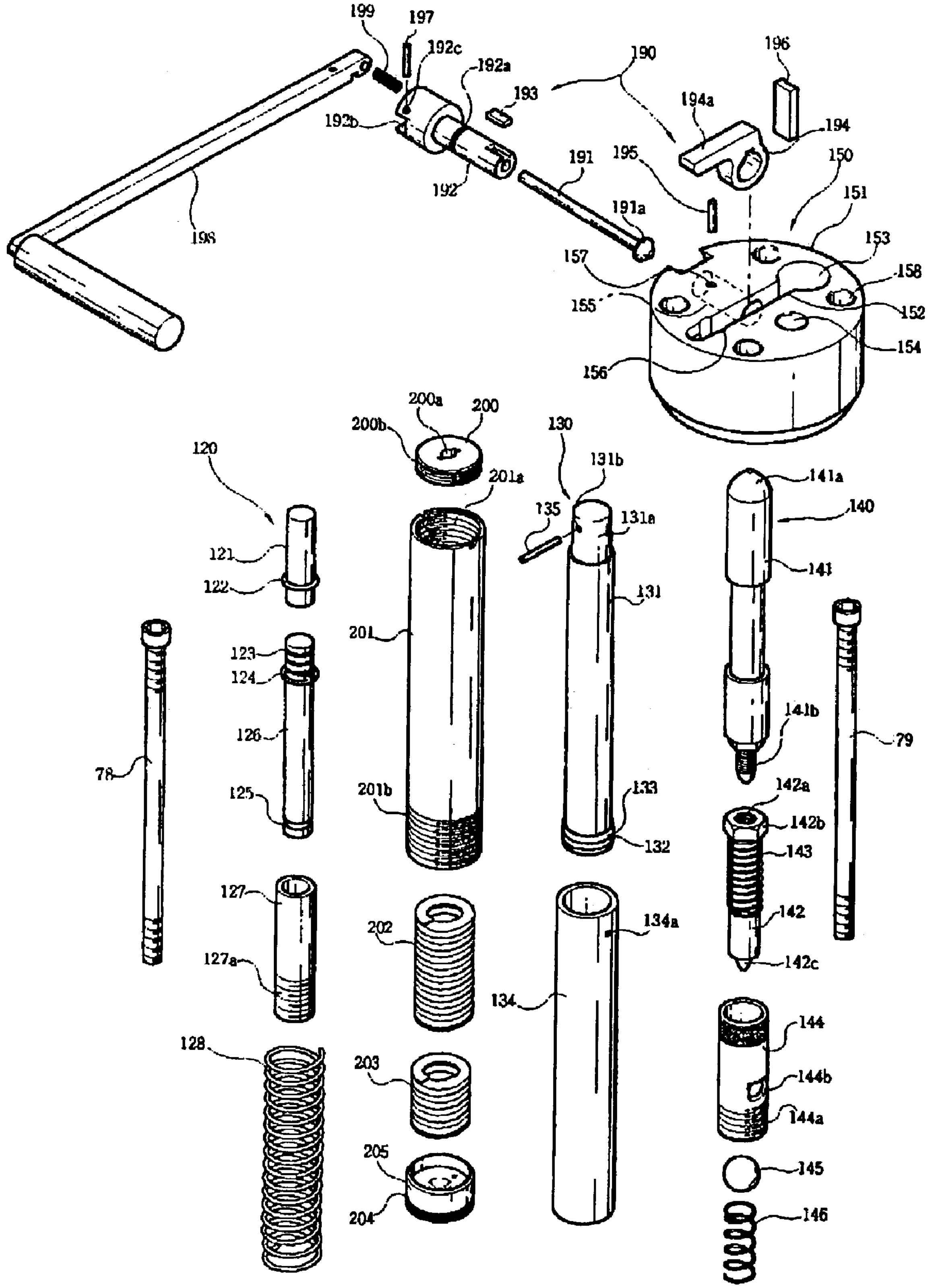

As depicted in FIGS. 15*a* through 16, oil hydraulic cylinder according to the fourth embodiment of the present invention includes a cap part 150 protrusively formed thereon with a compression means 120 for forcibly generating oil pressure, operation means 130 fixedly connected to an object for lifting, stopping and lowering the object and adjusting means 140 for controlling at least the lowering operation of the object; a body part 160 connected inside a body case 161 to the compression means 120, the operation means 130 and the adjusting means 140 and formed with a plurality of cylinders and pistons for carrying out an oil pressing operation; a base part 180 coupled underneath the body part 160 and formed therein with a predetermined flow route; an oil control mechanism 170 for controlling oil flowing in an oil route formed inside the base part 180 ; and manipulating means 190 disposed at one side of the cap part 150 for simultaneously controlling the compression means 120, the operation means 130 and the adjusting means 140.

In other words, the cap part 150 includes a stopper-shaped cap 151 formed at a central upper surface thereof with an long hole 152, and the long hole 152 is interconnectedly formed at one side thereof with an operation hole 153 having a diameter larger than that of the long hole 152 so that an operation rod 131 of the operation means 130 can protrude therefrom. An adjusting hole 154 is formed at a predetermined place spaced apart from the long hole 152 relative to an upper surface of the cap 151 for an adjusting rod 141 of the adjusting means 140 to be vertically accommodated. The cap 151 is formed at one side of the circumference thereof with a horizontal hole 155 so that a pressing pin 191 of the manipulating means 190 traverses the long hole 152 to be insertedly connected to the adjusting hole 154.

Furthermore, a compression hole 156 having a width larger than that of the long hole 152 is formed at a place spaced out at a predetermined distance from the other distal end relative to an interior of the long hole 152 so that a compression rod 121 of the compression means 120 can be inserted thereinto. The cap 151 is formed thereon with a pin hole 157 for the horizontal hole 155 to be connected. The cap 151 is also formed thereon with a plurality of coupling holes 158 so that a plurality of coupling rods 78 and 79 can vertically penetrate therethrough.

Meanwhile, the body part 160 has a body case 161 therein which is in turn disposed with the compression means 120. The compression means 120 further includes a first piston 126 disposed with a fixation ring 122 at a lower circumference of a compression rod 121 at the compression means 120 which is inserted into the compression hole 156 of the cap 151 and disposed at a lower section thereof with a plurality of O-rings 123 and a fixation washer 124 and also disposed at a lowermost circumference thereof with an O-ring 125, a first cylinder 127 into which the first piston 126 is inserted and formed with a threaded surface 127*a*, and a resilience member 128 inserted into a circumference of the first cylinder 127 and hitched at one side thereof by the washer 124 of the first piston 126. Therefore, in the construction thus described, the piston 126 is moved by the vertical operation of the compression rod 121 to generate an oil pressure.

The cap 151 is formed at a groove part (not shown) thereunder with a second cylinder 201, upper and lower resilience members 202 and 203, and a first piston pad 205. The second cylinder 201 is formed at a central upper surface thereof with an opening 200*a* through which a tool such as a driver can be inserted for easy rotation of a stopper 200 and formed with a threaded surface 201*a* into which the stopper 200 circumferentially formed with a threaded surface 200*b* can be inserted thereinto and formed from an inner circumferential upper end to a predetermined depth with a threaded surface 201*a* for being coupled with the threaded surface of the stopper 200 to guide the stopper 200 to ascend and descend and formed at a lowermost circumferential end thereof with a threaded surface 201*b*.

The upper and lower resilience members 202 and 203 are respectively inserted into upper and lower insides of the second cylinder 201 to apply respectively different resilience and to apply resilience simultaneously relative to height of the stopper 200. The first piston pad 205 is circumferentially disposed with an O-ring 204 so as to be air tightly inserted via a lower side of the second cylinder 201 and to apply pressure to the upper and lower resilience members 202 and 203.

At this time, the upper resilience member 202 is made either of a steel wire of thick diameter or of a coil having a longer free length in order to increase the resilience more than that of the lower resilience member 203. Particularly, the upper resilience member 202 is constructed to communicate with the lower resilience member 203 and to have a resilience strong enough to cope with a man's weight while the lower resilience member 203 has a rather weak resilience to cope with a woman's weight.

Meanwhile, an operation rod 131 of operation means 130 which is inserted into an operation hole 153 of the cap 151 is integrally formed at a lower circumference thereof with a second piston pad 133 having at least more than one seal 132, and the operation rod 131 is coupled thereunder with a third cylinder 134 formed at an upper circumferential side thereof with a bypass hole 134*a* in order for the second piston pad 133 to be air tightly inserted via the seal and to be lifted and lowered by oil pressure.

The operation rod 131 is formed at an upper end thereof with a tapered surface 131 for an object to be easily inserted, and the tapered surface 131*a* is formed at a circumferential surface thereof with a pin hole 131*b* into which a coupling pin 135 is inserted so that a coupling between the operation rod 131 and an object cannot be separated.

Figure 20:
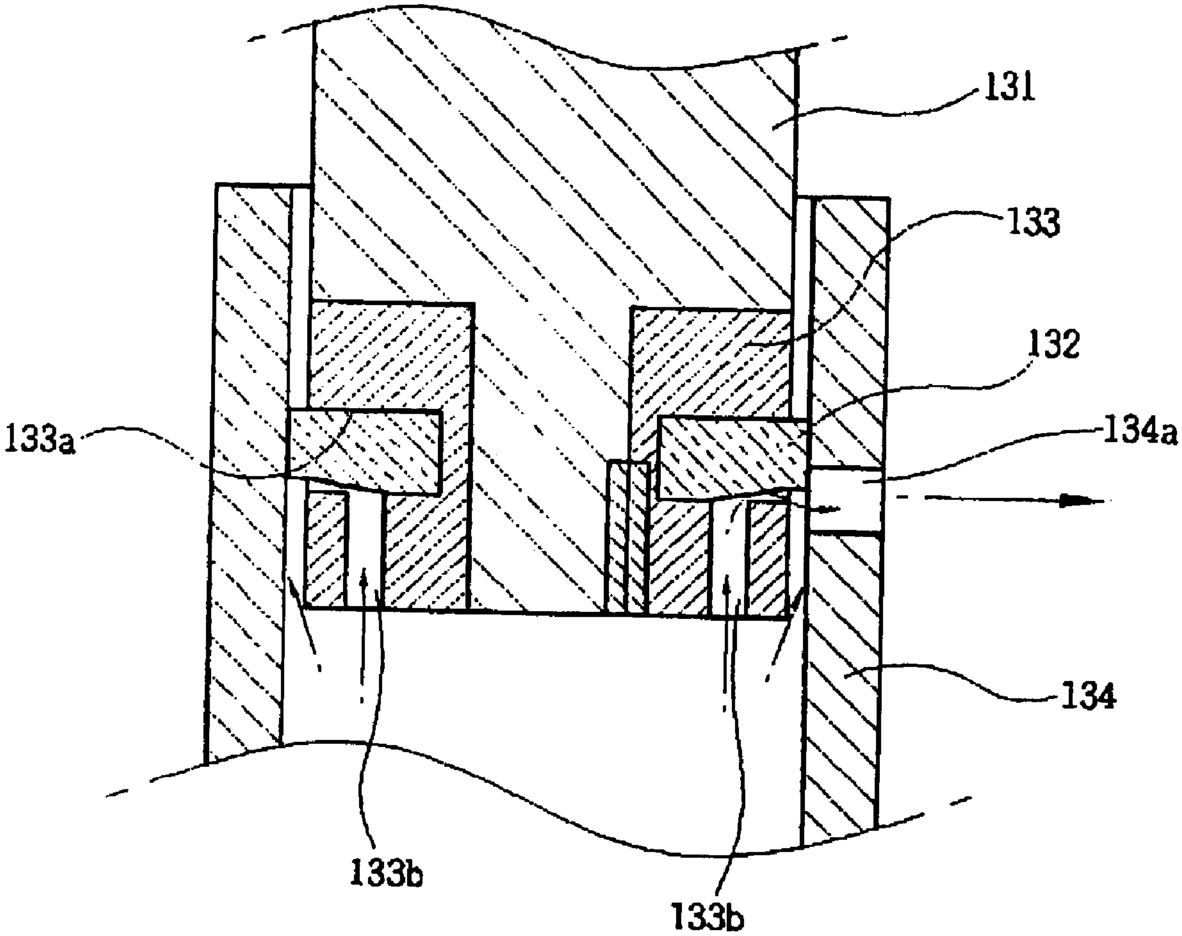

As depicted in FIG.20, the second piston pad 133 is formed at a midcircumferential height thereof with a seal groove part 133*a* for the seal 132 to be easily inserted thereinto. The seal 132 is formed thereunder with a plurality of bypass holes 133*b* for the seal groove part 133*a* to be perpendicularly connected with an oil passage.

There is formed a gap between the seal groove part 133*a* and the seal 132 which is shrunken by the oil pressure in the third cylinder 134 when the operation rod 131 is lifted up to an uppermost end to reach a limit within the third cylinder 134. At the same time, the seal groove part connects the bypass hole 133*b* of the second piston pad 133 to the bypass hole 134 of the third cylinder 134 to prevent the oil pressure in the third cylinder 134 from being applied to the operation rod 131.

The adjusting rod 141 of the adjusting means 140 inserted into the adjusting hole 154 of the cap 151 includes a control rod 142 formed thereon with a wedge-shaped contact surface 141*a* and formed thereunder with a threaded surface 141*b*, and formed at a central lower end thereof with a threaded surface 142*a* for coupling with the threaded surface 141*b* and formed at an upper circumference thereof with a hexagonal flange surface 142*b* and at a lower central circumference thereof with a sharp-pointed wedge surface 142*c*, a resilience member 143 for being inserted into a circumference via a lower distal end of the control rod 142 to be hitched at the flange surface 142*b*, a coupling part 144 formed therein with a staired surface (no reference numeral) so that the control rod 142 is inserted via the resilience member 143 for the base part 180 to be coupled thereon for upwardly and resiliently support thereto and formed at a lower circumference thereof with a bypass hole 144*b* at an upper height of the threaded surface 144*a*, a ball 145 inserted between a fourth passage 182*d* and a fifth passage 182*e* formed inside a body 181 of the base part 180 in order to face a lower part of the coupling part 144, and a resilience member 146 disposed under the ball 146 for upwardly and resiliently supporting the ball 146.

At this time, the ball 145 is lowered by the wedge surface 142*c* of the control rod 142 communicating with the lowering of the adjusting rod 141 and discharges the oil of the fourth passage 182*d* and the fifth passage 182*e*.

Figure 17:
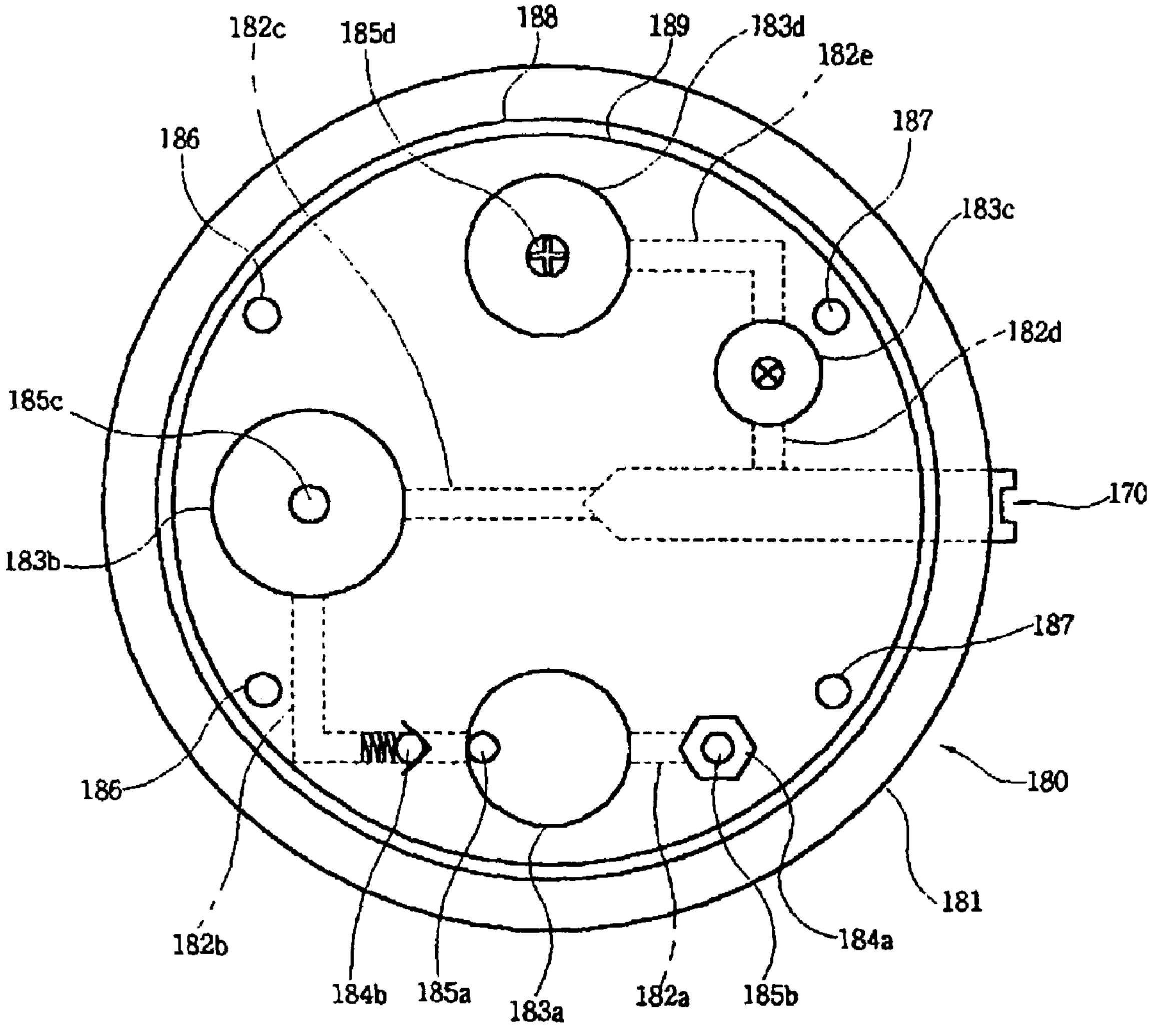

Furthermore, as illustrated in FIG. 17, the base part 180 is composed of a round body 181, a horizontal part 189 protrusively formed at an upper side of the body 181, an O-ring 188 disposed between the body 181 and the horizontal part 189 and an oil control mechanism 170.

The horizontal part 189 includes a first groove part 183*a* screwed to the first cylinder 127, a second groove part 183*b* screwed to the second cylinder 201, a third groove part 183*c* inserted into the coupling part 144 and a fourth groove part 183*d* mounted with the third cylinder 134.

Furthermore, the horizontal part 189 further comprises a first check valve 184*a* protruded at one lateral surface of the first groove part 183*a* and a plurality of coupling holes 186 and 187 symmetrically formed for threadedly coupled with coupling rods 78 and 79.

The first groove part 183*a* is formed with an oil outlet 185*a* and is connected to the first check valve 184*a* via the first passage 182*a*. The first check valve 184*a* is formed with an oil inlet 185*b*, and the second passage 182*b* between the first groove part 183*a* and the second groove part 183*b* is formed with a second check valve 184*b*.

The second groove part 183*b* is formed with an oil inlet/outlet 185*c*, and an oil control mechanism 170 is formed between the third passage 182*c* formed between the second groove part 183*b* and the third groove 183*c* and the fourth passage 182*d*. Between the third groove part 183*c* and the fourth groove part 183*d* there is formed a fifth passage 182*e*. The fourth groove part 183*d* is disposed with an oil outlet 185*d*.

Figure 18:
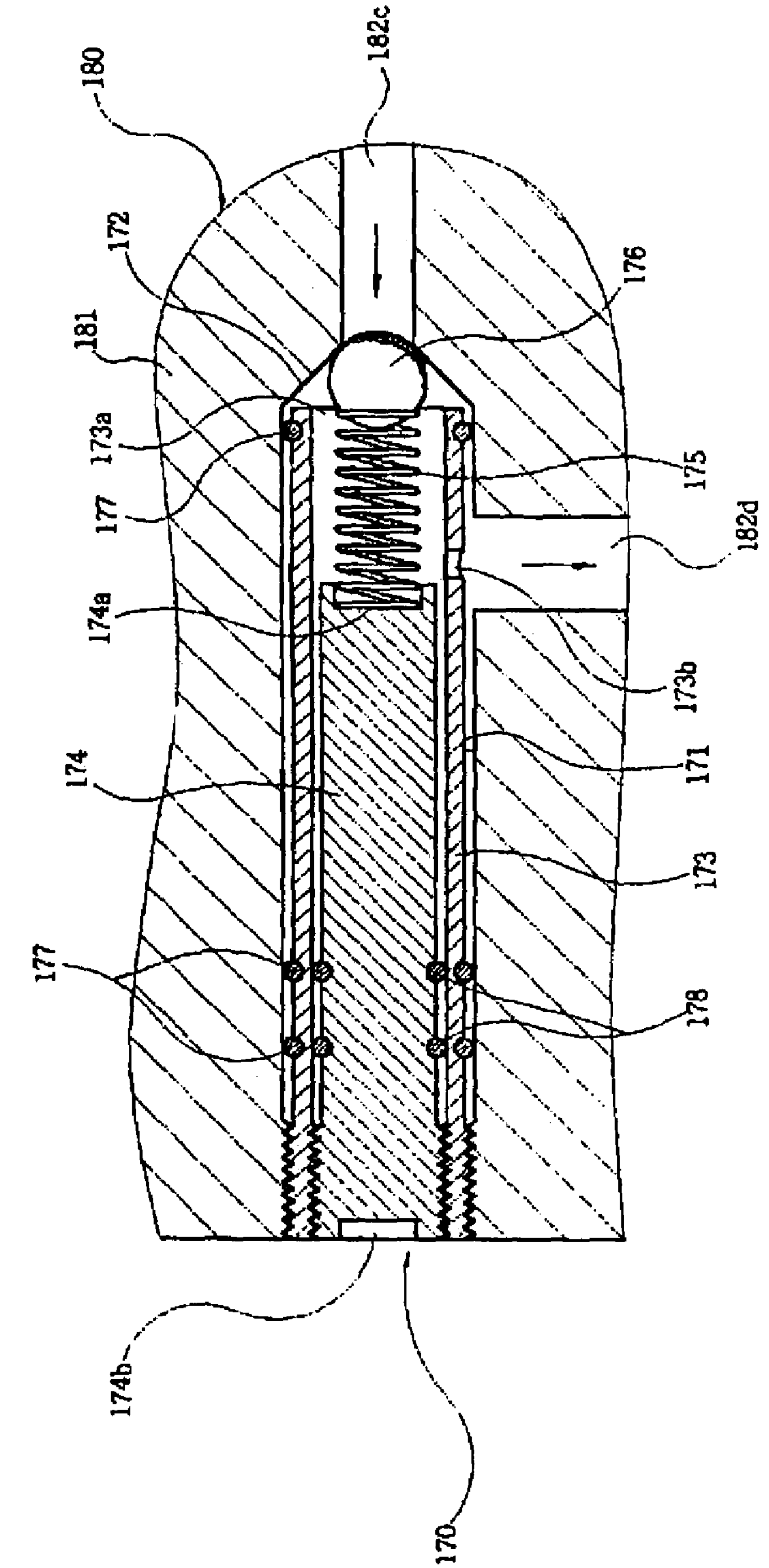

Meanwhile, the oil control mechanism 170 serves to control the oil flowing from the third passage 182*c* of the base part 180 to the fourth passage 182*d*. As depicted in FIG. 18, the oil control mechanism 170 is formed with a through part 171 having a diameter larger than that of the third passage 182*c* and formed with a slope 172 at a border abutting on the through part 171 and the third passage 182*c*. The oil control mechanism 170 is further formed at a distal end portion thereof with an opening 173*a*, and a tube 173 formed with an oil outlet 173*b* at a circumferential side thereof from a predetermined area spaced from the opening 173*a* is insertedly screwed into the through part 171.

The tube 173 is screwed into by a pin rod 174 formed at a distal end portion thereof with a receiving groove 174*a* and formed at a rear end thereof with a tool inserting hole 174*b*. The receiving groove 174*a* of the pin rod 174 is accommodated with a ball 176 via a resilience member 175, and at the same time, the ball 176 is made to be accommodated with the slope 172.

The resilience member 175 is adjusted in the strength thereof by the adjusted movement of the pin rod 174 in the tube 173 to thereby adjust the pressure of the ball 176 when the pin rod 174 is rotated to a positive direction by using the tool insertion groove 174*b* into which a tool such as a driver or a wrench or the like is inserted, and the ball 176 in turn adjusts the oil pressure flowing from the third passage 182*c* to the fourth passage 182*d*.

Furthermore, a plurality of O-rings 177 and 178 are installed at an assembly gap between the tube 173 and the body 81 of the base part 180 side, and an assembly gap between the pin rod 174 and the tube 173 in order to prevent the oil from leaking.

The manipulating means 190 includes a pressing rod 191 formed at a tip end thereof with a wedge-shaped contact surface 191*a* so as to be inserted into the adjusting rod 154 via the horizontal hole 155 of the cap 151 to face at a right angle the contact surface 141*a* of the adjusting rod 141 inserted into the adjusting hole 154, a rotating rod 192 rotatably inserted into the horizontal hole 155 and horizontally supporting the pressing rod 191 thereinside, a cam part 194 formed at an eccentric position thereof with a pressing protruder 194*a* inserted into a long hole 152 and rotatably coupled to a circumferential tip end of the rotating rod 192 via a key 193 to apply pressure to or release the pressure from the pressure rod 121 inserted into the compression hole 156 of the cap 151, a coupling pin 195 for being inserted via the pin hole 157 of the cap 151 and surface-coupling with a ring-shaped concave groove 192*a* on the rotating rod 192 inserted into the horizontal hole 155 and for rotating the rotating rod 192 and holding same in the horizontal movement, a friction member 196 interposed between the operation rod 131 and the cam part 194 relative to the long hole 152 of the cap 151 for applying a skin frictional force or releasing same lest that the operation rod 131 should be rotated in response to a rotating eccentric angle of the cam part 194, an adjusting lever 198 inserted into a cut-out groove 192*b* formed at an external end of the rotating rod 192 and coupled via a hinge pin 197 inserted through the pin hole 192*c* formed at an eccentric external side of the rotating rod 192 for rotating the rotating rod 192 to the right or reverse direction in response to vertical reciprocating movement or advancing the pressing rod 191 in response to horizontal rotation, and a resilience member 199 disposed at a predetermined distanced place from the hinge pin 197 relative to the rotating rod 192 and the adjusting lever 198 to release the pushing force of the adjusting lever 198 and the pressing rod 191 and to return the adjusting lever 198 to the original position.

Unexplained reference numeral 162 in the drawing is a filter disposed at the oil inlet 185*b* of the first check valve 184*a* in the body case 161, and another reference numeral 180*a* is a leg part of a chair coupled to the base part 180.

Now, operation and effect of the oil cylinder thus constructed will be described.

First of all, when the adjusting lever 198 is vertically reciprocated as shown in FIGS. 15*a* and 15*b*, the rotating rod 192 fitted into the adjusting lever 198 and simultaneously coupled by the hinge pin 197 is rotated to thereby rotate the cam part 194 coupled at a distal end portion of the rotating rod 192 via the key 193. When the cam part 194 is rotated, the pressing protruder 194*a* integrally formed at one side of the cam part 194 is rotated downwards to press the compression rod 121 disposed thereunder and to press the first piston 126 sequentially coupled under the compression rod 121. The compression rod 121 is once pressed by the pressing protruder 194*a* but then lifted to an initial state by resilience of the resilience member 128 when the first piston 126 is lifted, thereby rotating the pressing protruder 194*a* in the reverse direction and to rotate the cam part 194. Thereafter, the rotating rod 192 and the adjusting lever 198 sequentially coupled to the cam part 194 are lifted to an initial state;

The compression rod 121 repeats the lifting or lowering operations in response to lifting and lowering operations of the adjusting lever 198 to allow the oil in the body case 161 to flow into the first passage 182*a* of the base part 180 via the first check valve 184*a*.

At this time, when the adjusting lever 198 is pulled upwards, the rotating rod 192 connected to the adjusting lever 198 is simultaneously rotated in the same direction to rotate the cam part 194 at the same time. When the cam part 194 is rotated upwards, a distal end portion of the pressing protruder 194*a* of the cam part 194 presses the friction member 196 disposed between the cam part 194 and the operation rod 131 via the long hole 152 of the cap 151 such that the friction member 196 strongly abuts against the external surface of the operation rod 131 to prevent the operation rod 131 from rotating.

Figure 21A:
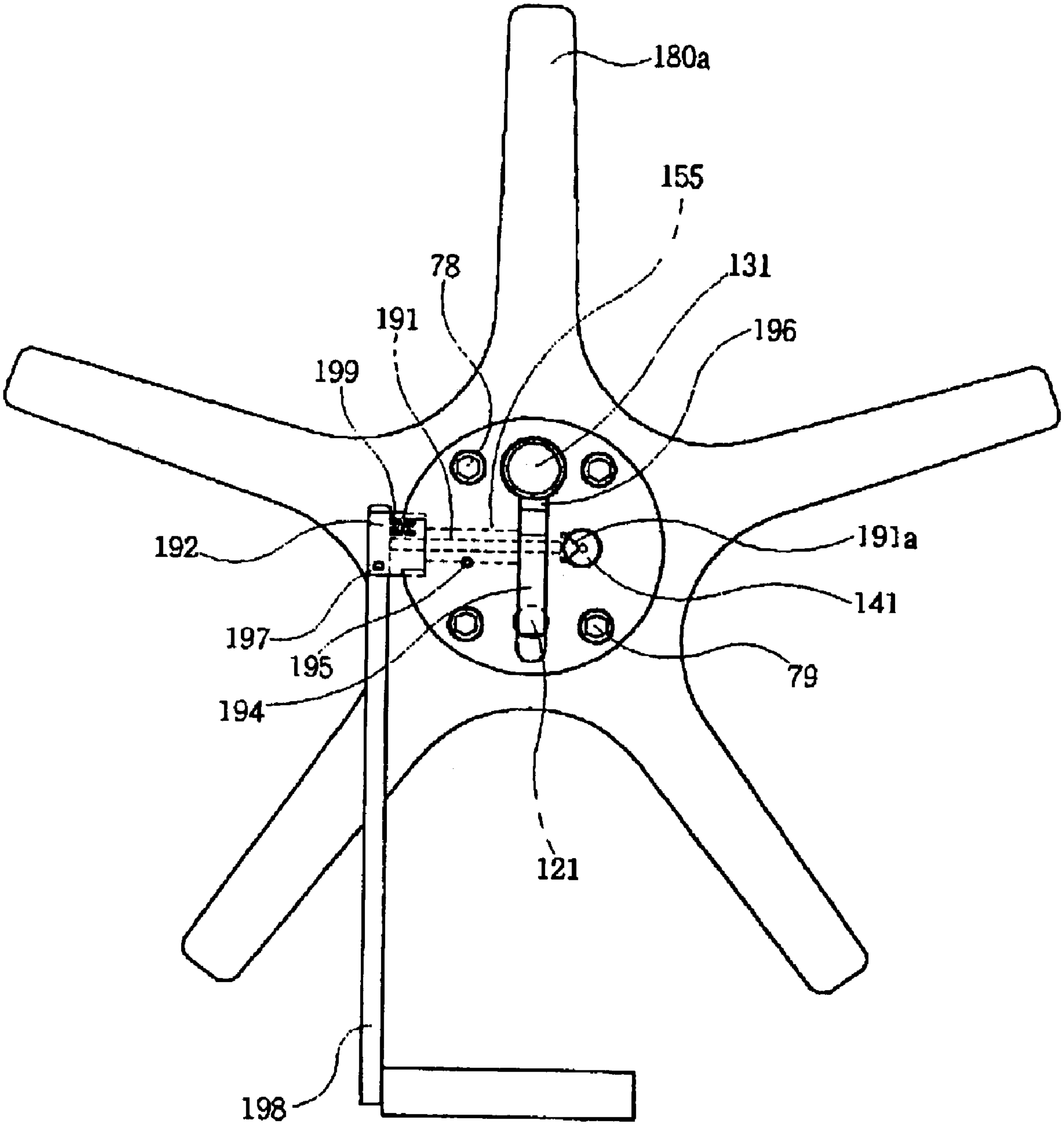
Figure 21B:
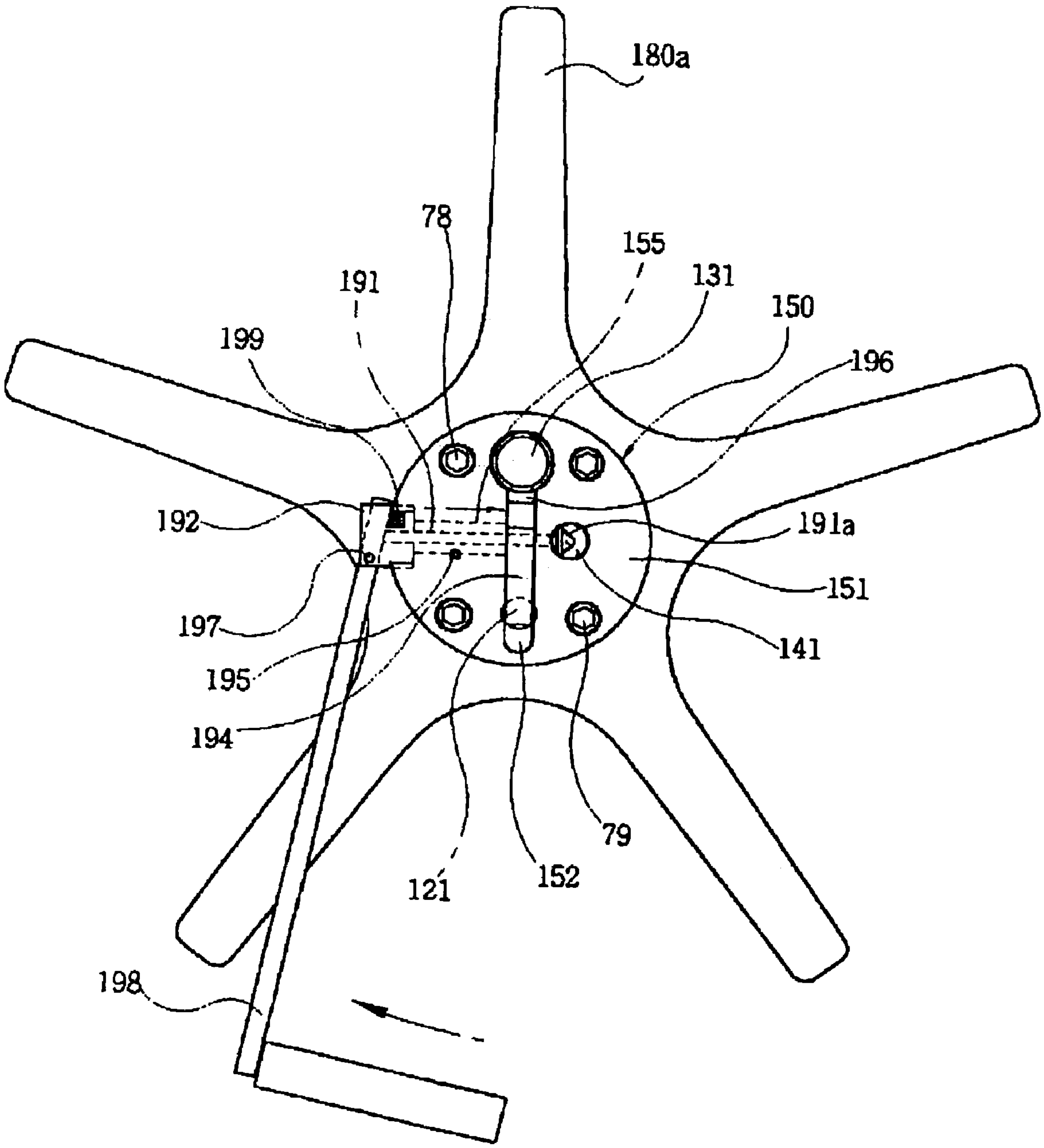

Meanwhile, as illustrated in FIG. 21*b*, when the adjusting lever 198 is laterally yanked, an opposite tip end portion of the adjusting lever 198 is inwardly moved around the hinge pin 197 for hinging the adjusting lever 198 and the rotating rod 192 to push the pressing rod 191 inserted into the rotating rod 192. When the pressing rod 191 is moved, the contact surface 191*a* at a tip end thereof presses the contact surface 141*a* disposed at an upper end side of the adjusting rod 141 perpendicularly inserted into the adjusting hole 154 of the cap 151 to thereby lower the adjusting rod 141.

Furthermore, as illustrated in FIG. 21*a*, when the adjusting lever 198 is released, the adjusting lever 198 is returned to an original state around the hinge pin 197 by the resilience of the resilience member 199 oppositely disposed at the hinge pin 197 relative to the tip end of the adjusting lever 198 and the rotating rod 192. The pressing rod 191 is pushed to an original state by the control rod 142 lifted in the coupling part 144 by the resilience of the resilience member 143 and concurrently by the lifting operation of the adjusting rod 141.

Next, operation relative to an inner-coupled structure of the oil cylinder thus described will be described.

Figure 19:
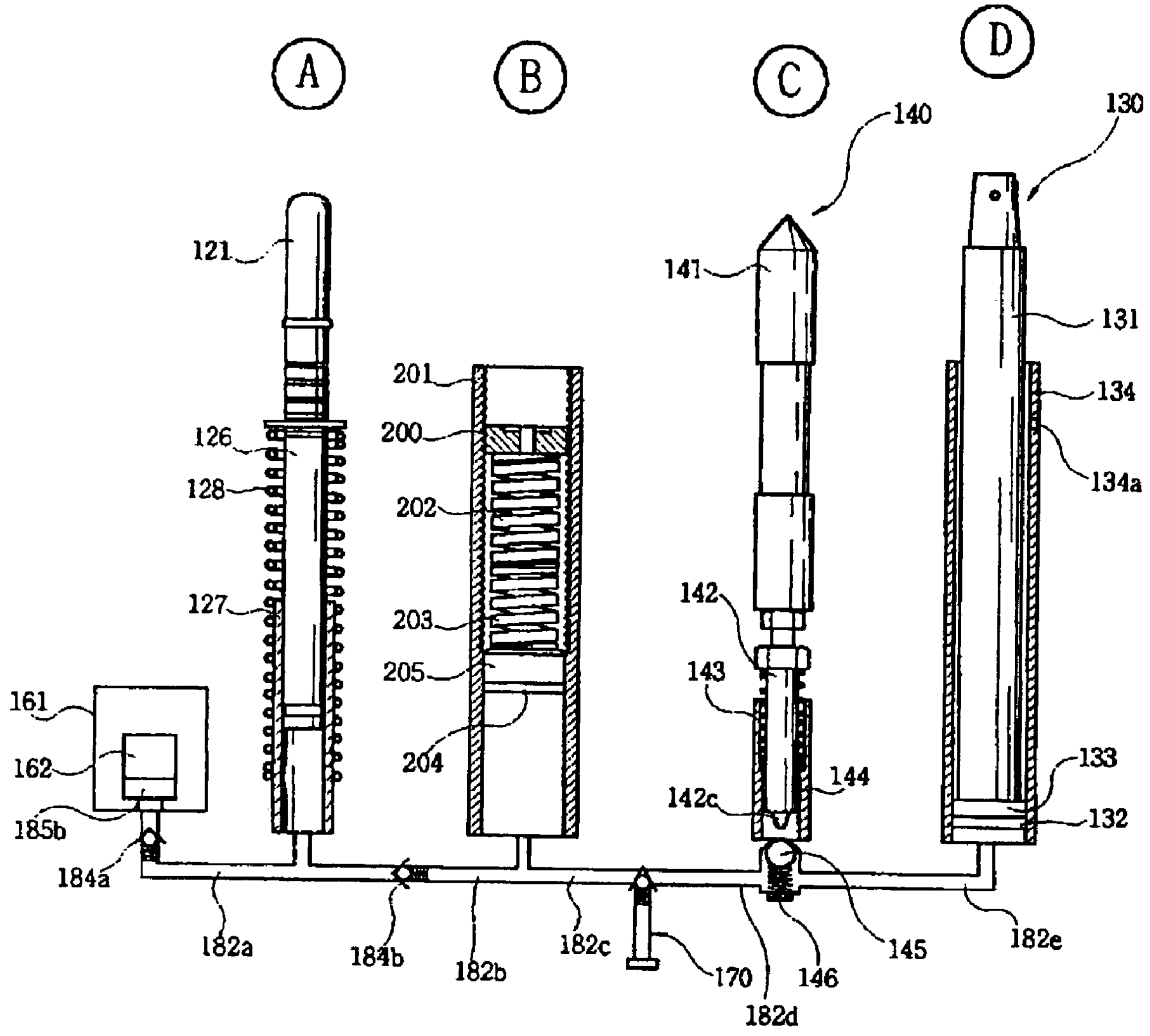

FIG. 19 is an assembled schematic structural drawing of the oil cylinder. The (A) part consists of the compression rod 121, the first piston 126, the first cylinder 127 and the resilience member 128. In the FIG. 19, when the compression rod 121 is pushed, the first piston 126 descends to shut off the first check valve 184*a* and simultaneously to open the second check valve 184*b* whereby the oil flows only through the second passage 182*b*. When the first piston 126 ascends, the first check valve 184*a* is opened to allow the oil filled in the body case 161 to be introduced and concurrently the second check valve 184*b* is shut off to prevent the oil in the second passage 182*b* from flowing backwards.

The (B) part includes the stopper 200, the second cylinder 201, the upper and lower resilience members 202 and 203, and the first piston pad 205. In the (B) part, the first piston pad 205 is lifted by the oil infused via the second passage 182*b*, whereby the oil is introduced into the second cylinder 201 and at the same time, flows into the fifth passage 182*e* via the third passage 182*c*, the oil control mechanism 170 and the fourth passage 182*d*.

At this location, the (B) part presses the upper and lower resilience members 202 and 203 so mounted as to abut on the upper and lower parts in two stages inside the second cylinder 201 when the first piston 126 of the (A) part is pressed to lift the first piston pad 205. When the first piston 126 is released, the first piston pad 205 is lowered by the resilience of the upper and lower resilience members.

At this time, when the stopper 200 screwed inside the second cylinder 201 is adjusted upwards, the upper and lower resilience members 202 and 203 adjust the stopper 200 with less resilience but when the stopper 200 is adjusted downwards, the upper and lower resilience members adjust the stopper 200 with stronger resilience.

This is because the upper resilience member 202 is manufactured with a steel wire of longer diameter or with a coil of longer free length than that of the lower resilience member 203. By way of example, when a man of heavy weight is seated, the lower resilience member 203 and the upper resilience member 202 are simultaneously compressed relative to the oil pressing operation applied to the first piston pad 205, while, when a woman of light weight is seated, only the lower resilience member 203 is compressed because the oil pressing operation applied to the first piston pad 205 is weaker than that of the man of heavy weight.

In other words, the upper resilience member 202 and the lower resilience member 203 communicating with the lifting operation of the first piston pad 205 respectively cope with different pressure changes thereby enabling to adjust the oil flow more smoothly. As a result, the second piston pad 205 of the second cylinder 201 can flow the oil to the third passage 182*c* when the first piston 126 is compressed and even when it is released such that a lifting object can be provided with a smooth treatment.

The oil control mechanism 170 adjusts the oil (oil pressure) flowing from the third passage 182*c* to the fourth passage 182*d* where it is very important to adjust the oil flow. This is because energy accumulated in the second cylinder 201 via the first piston pad 205 differs according to the oil flowing into the fourth passage 182*d* from the third passage 182*c*, such that when the oil control mechanism 170 is controlled to allow less oil to flow, most of the oil is supplied into the second cylinder 201 through the second passage 182*c*, and alternatively when the oil control mechanism 170 is controlled to allow more oil to flow, most of the oil flows into the third passage 182*c* and the fourth passage 182*d* through the second passage 182*b*.

Furthermore, as illustrated in FIG. 18, the oil control mechanism 170 is adjusted in such a way that when the pin rod 174 is rotated by using a tool such as a driver or the like, the ball 176 mounted at a distal end portion of the pin rod 174 via the resilience member 175 adjusts the contact pressure with the slope 172 to thereby control the oil flow that pushes the ball 176 at the third passage 182*c* and flows into the fourth passage 182*d* via the through part 171.

The (C) part includes the adjusting rod 141, the control rod 142, the resilience member 143, the coupling part 144, the ball 145 and the resilience member 146.

In the (C) part, when the adjusting rod 141 is compressed to lower the control rod 142, the ball 145 descends to allow the oil pressure flowing to the fourth passage 182*d* and the fifth passage 182*c* to be discharged via the bypass hole 144*b* of the coupling part 144, and when the adjusting rod 141 is not compressed, the control rod 142 is lifted by the resilience of the resilience member 146 and simultaneously the ball 145 is operated by the resilience of the resilience member 146 such that the oil flowing through the fourth passage 182*d* is made to directly flow into the fifth passage 182*c*.

The (D) part includes the operation rod 131, the second piston pad 133 and the third piston 134, where the operation rod 131 connected to an object is lifted, lowered and stopped by the control of the oil flowing to the fourth passage 182*d*.

At this time, as depicted in FIG. 20, when the operation rod 131 is lifted to the uppermost end to reach a point of no further movement inside the third cylinder 134, the oil in the third cylinder 134 is discharged to a passage connected to the bypass hole 134*a* of the third cylinder 134 from the bypass hole 133*b* of the second piston pad 133, thereby applying no pressure to the operation rod 131 and preventing the operation rod 134 from being detached therefrom.

Now, a fifth embodiment of the present invention will be described in detail with reference to FIG. 22. By way of reference, like numerals as in the first and fourth embodiments refer to similar or equivalent parts or portions in this drawing.

Figure 22:
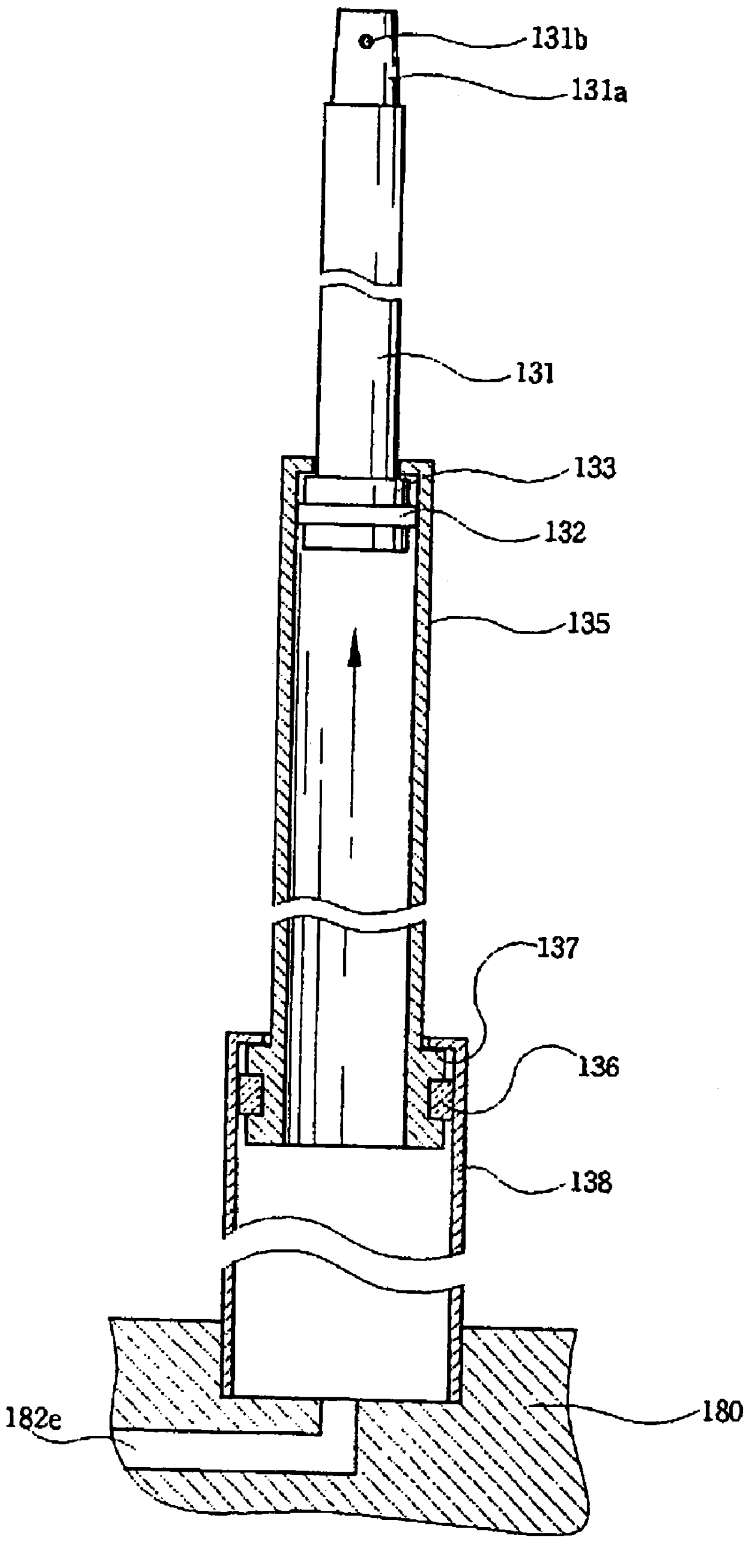
FIG. 22 is a sectional view of principal parts for illustrating a two-stage lifting structure of an operation rod according to a fifth embodiment of the present invention.

In the fifth embodiment depicted in FIG. 22 according to the present invention, an operation rod 131 is lifted or lowered in two stages by a fourth cylinder 135 and the fifth cylinder 138.

In other words, the operation rod 131 inserted into an operation hole 153 of a cap 151 is integrally formed at an external tip end thereof with a second piston pad 133 mounted with at least more than one O-ring 132. The operation rod 131 is formed thereunder with a fourth cylinder 135 integrally mounted with a third piston pad 137 formed at a lower circumference thereof with an O-ring 136 for the second piston pad 133 to be air tightly inserted via the O-ring 132 and to be lifted or lowered by the oil pressure. The operation rod 153 is further coupled thereunder with a fifth cylinder 138 insertedly coupled to a fourth groove 183*d* formed at an upper surface of a base part 180 such that the third piston pad 137 can be air tightly inserted via the O-ring 136 to be lifted or lowered by the oil pressure.

When oil flows under the fifth cylinder 138 while the operation rod 131 thus constructed is lowered under an initial state, the oil simultaneously applies pressure to the second piston pad 133 formed underneath the operation rod 131 disposed underneath the fifth cylinder 138 and simultaneously to a bottom surface of the third piston pad 137 disposed underneath the fourth cylinder 135, thereby lifting the fourth cylinder 135 to a level of a first stage. When the fourth cylinder 135 is moved to a top end of the fifth cylinder 138 to reach a point of no further movement, a residual oil pushes a bottom of the second piston pad 133 at the operation rod 131 to lift the operation rod 131 to a level of a second stage.

As a result, when the operation rod 131 is applied with or released by the oil pressure, the operation rod 131 is lifted or lowered by the fourth cylinder 135 and the fifth cylinder 138 in two steps.

Now, a sixth embodiment of the present invention will be described in detail with reference to FIG. 23. Again, like numerals as in the fourth embodiment refer to similar or equivalent parts or portions and redundant description thereto will be omitted.

Figure 23:
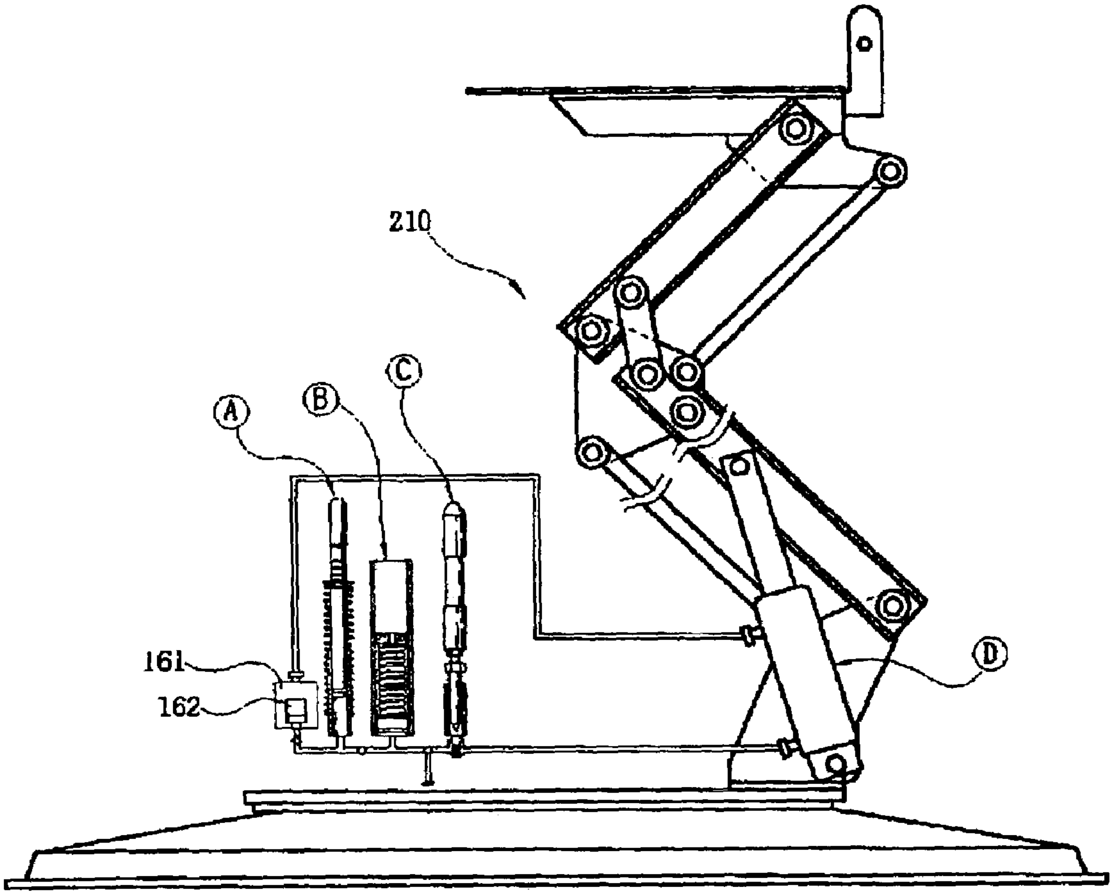
FIG. 23 is a schematic constitutional view for illustrating an assembled mounted example of an oil hydraulic cylinder to a parallel link according to a sixth embodiment of the present invention.

As illustrated in FIG. 23, the sixth embodiment of the present invention is a combined structure of an oil cylinder and a parallel link for lifting or lowering an object. In other words, by way of example, a body case 161 and constructions of (A), (B) and (C) in the fourth embodiment of the present invention shown in FIG. 19 are either erected or layed down at one side of a base part (no reference numeral designated), while construction of (D) part is made to communicatively be operated with a parallel link means 210 of the known art.

Furthermore, it should be apparent that an oil pressure passage underneath the construction of (D) part is connected to an oil pressure passage underneath the construction of (C) part, and an oil pressure passage at one side of the body case 161 is connected to an oil pressure passage at an upper side of the construction of (D) part, thereby enabling the oil pressure to bypass.

As apparent from the foregoing, there are advantages in the oil hydraulic cylinder thus described according to the first through sixth embodiments of the present invention applicable to industrial or vehicular jacks or chairs in that an object can be lifted smoothly without being swayed or shaken and can be prevented from being unnecessarily rotated, thereby ruling out an uncomfortable feeling in a chair and providing an increased accuracy to industrial equipment.

What is claimed is:

1. A hydraulic cylinder comprising a cap part, a body part, and a base part, wherein the cap part comprises: a cap; a support part formed on an upper surface of the cap; an operation hole formed at an upper surface of the support part; a hitching member formed adjacent to the operation hole; a manipulating means; an adjusting hole formed at an upper surface of the cap; a compression hole; and an adjusting part formed at the cap;

wherein the body part comprises: a body case; a compression rod inserted into a compression hole of the cap; a first piston disposed under the compression rod; a first cylinder having an inner cylinder space for sealingly receiving the first piston; a resilience member disposed adjacent to the first cylinder for biasing the first piston upwardly; a second cylinder having a substantially closed upper end; a resilience member inserted into the second cylinder; a piston member sealingly inserted into the second cylinder for pressing the resilience member; an operation rod inserted in the operation hole of the cap and having thereunder a second piston member; a third cylinder having an inner cylinder space for sealingly receiving the operation rod; an adjusting rod having a hitching groove and inserted in the adjusting hole of the cap; a control rod disposed under the adjusting rod and formed thereunder with a second adjusting groove and a first adjusting groove each spaced out at a distance; a resilience member disposed about the control rod for biasing the control rod upwardly; and a coupling part having an insertion hole for receiving the control rod therein; and wherein the base part comprises: a body; a first groove part for coupling with the first cylinder; a second groove part for coupling with the second cylinder; a third groove part for coupling with the coupling part; a fourth groove part for coupling with the third cylinder; a first check valve disposed at one lateral surface of the first groove part; a first passage formed between the first groove part and the first check valve; a second passage formed between the first groove part and the second groove part; a second check valve formed in the second passage; an oil control mechanism formed between a third passage formed between the second groove part and the third groove part and a fourth passage; and a fifth passage formed between the third groove part and a fourth groove part.

2. The hydraulic cylinder as defined in claim 1, wherein the manipulating means includes a hinge rod coupled with an adjusting lever for controlling the compression rod and the adjusting rod.

3. The hydraulic cylinder as defined in claim 1, wherein the cap part includes an adjusting part formed at a lateral surface of the cap with a hole into which a ball and a spring are inserted and coupled via a bolt.

4. The hydraulic cylinder as defined in claim 1, wherein the support part of the cap part includes a pin hole formed via penetration through a lateral surface and a pin insertedly fixed to the pin hole.

5. The hydraulic cylinder as defined in claim 1, wherein the cap includes at a bottom surface thereof a moving groove having a larger diameter than that of the operation hole and a groove part for insertion into the stopper of the second cylinder.

6. The hydraulic cylinder as defined in claim 1, wherein the first piston member at the body part is formed thereon with a head part and circumferentially formed with a plurality of seals.

7. The hydraulic cylinder as defined in claim 1, wherein the second adjusting groove of the control rod is formed with a horizontal through hole and the horizontal through hole is downwardly connected to a vertical through hole through a central interior of the control rod.

8. The hydraulic cylinder as defined in claim 1, wherein the coupling part comprises: oval pillar-shaped coupled part having cut-out parts shaped to an oval pillar at three lateral surfaces; an inlet and an outlet respectively formed on each side of the cut-out part; seals each formed on external circumferences of the inlet and the outlet: and an incised part formed thereunder the cut-out part for use as an oil groove.

9. The hydraulic cylinder as defined in claim 1, wherein a control rod at the body part is formed right underneath the second adjusting groove with a first adjusting groove.

10. The hydraulic cylinder as defined in claim 1, wherein the oil control mechanism comprises: a passage part having a diameter larger than that of the third passage; a tube inserted into the passage part for threaded coupling and formed at a distal end portion thereof with an opening for being air tightly sealed by a plurality of seals and formed with an outlet at one side thereof; and a pin rod formed at a distal end portion thereof with an adjusting pinnacle for controlling the oil flowing from the third passage to the fourth passage via the outlet so as to be inserted into the tube for threaded coupling and to be air tightly sealed by a plurality of seals and formed at a rear part thereof with a handle.

11. A hydraulic cylinder comprising: a cap part coupled with a compression means for generating oil pressure, operation means connected to an object for lifting and stopping the object in association with adjusting means; a body part including the compression means, the operation means and the adjusting means and having a plurality of cylinders and pistons for carrying out an oil pressing operation; a base part coupled underneath the body part and having a flow route; an oil control mechanism for controlling oil flowing in an oil route formed inside the base part; and manipulating means disposed at the cap part for controlling the compression means, the operation means and the adjusting means; wherein the oil control mechanism includes an elongate opening with an elongate rod disposed therein, the elongate rod being adjustable in its axial location within the elongate opening, and a ball received in the elongate opening at a distal location from the elongate rod, the ball being biased by a resilience member for controlling the oil flow in the flow route of the base part in order to control lifting, and stopping of the object connected to the operation means; and wherein the adjusting means includes: an adjusting rod inserted at an upper end thereof into the adjusting hole of the cap part and formed at an upper surface thereof with a contact surface and also formed with a threaded surface; a control rod formed at a central upper surface thereof with a threaded surface for coupling with the threaded surface and formed at an upper circumference thereof with a hexagonal flange surface and also formed at a central lower end thereof with a sharp-pointed wedge surface; a resilience member for being inserted into an external circumference via a lower distal end of the control rod to be hitched at the flange surface; a coupling part formed therein with a staired surface so that the control rod is inserted via the resilience member for the base part to be coupled thereon for upwardly and resiliently support thereto and formed at a lower circumference thereof with a bypass hole at an upper height of the threaded surface; a ball inserted between a fourth passage and a fifth passage formed inside a body of the base part in order to face a lower part of the coupling part; and a resilience member disposed under the ball for upwardly and resiliently supporting the ball.

12. The hydraulic cylinder as defined in claim 11, wherein the cap part comprises: a long hole centrally formed at an upper side of the stopper-shaped cap; an operation hole interconnectedly formed at one side of the long hole and having a diameter larger than that of the long hole so that an operation rod of the operation means can protrude therefrom; an adjusting hole formed at a predetermined place spaced apart from the long hole relative to an upper surface of the cap for an adjusting rod of the adjusting means to be vertically accommodated; a horizontal hole formed at one side of the circumference of the cap so that a pressing pin of the manipulating means traverses the long hole to be insertedly connected to the adjusting hole; a compression hole having a width larger than that of the long hole and formed at a place spaced out at a predetermined distance from the other distal end relative to an interior of the long hole so that a compression rod of the compression means can be inserted thereinto; a pin hole formed on the cap for connection with the horizontal hole; and a plurality of coupling holes formed on top of the cap so that a plurality of coupling rods can vertically penetrate therethrough.

13. The hydraulic cylinder as defined in claim 11, wherein the cap part further comprises a second cylinder, upper and lower resilience members, and a first piston pad, wherein the second cylinder is formed at a central upper surface thereof with an opening through which a tool such as a driver can be inserted for easy rotation of a stopper and formed with a threaded surface into which the stopper circumferentially formed with a threaded surface can be inserted thereinto and formed from an inner circumferential upper end to a predetermined depth with a threaded surface for being coupled with the threaded surface of the stopper to guide the stopper to ascend and descend and formed at a lowermost circumferential end thereof with a threaded surface, and the upper and lower resilience members are respectively inserted into upper and lower insides of the second cylinder to apply respectively different resilience and to apply resilience simultaneously relative to height of the stopper, and the first piston pad is circumferentially disposed with a seal so as to be air tightly inserted via a lower side of the second cylinder and to apply pressure to the upper and lower resilience members.

14. The hydraulic cylinder as defined in claim 13, wherein the upper resilience member has a greater resilience than that of the lower resilience member.

15. The hydraulic cylinder as defined in claim 11, wherein the operation means comprises: an operation rod inserted at an upper end thereof into an operation hole of the cap and integrally formed at a lower circumference thereof with a second piston pad having at least more than one seal; and a third cylinder formed at an upper circumferential side thereof with a bypass hole and insertedly coupled thereunder into a fourth groove of the base part in order for the second piston pad to be air tightly inserted via the seal and to be lifted and lowered by oil pressure, wherein the second piston pad is formed at a mid-circumferential height thereof with a seal groove part for the seal to be easily inserted thereinto and is also formed with a plurality of bypass holes for the seal groove part to be perpendicularly connected with an oil passage.

16. The hydraulic cylinder as defined in claim 11, wherein the operation means comprises: an operation rod inserted at an upper end thereof into the operation hole of the cap part and integrally formed at an external tip end thereof with a second piston pad mounted with at least more than one seal; a fourth cylinder integrally mounted with a third piston pad formed at a lower circumference thereof with a seal for the second piston pad to be air tightly inserted via the seal and to be lifted or lowered by the oil pressure; and a fifth cylinder insertedly coupled thereunder to a fourth groove part of the base part such that the third piston pad can be air tightly inserted via the seal to be lifted or lowered by the oil pressure.

17. The hydraulic cylinder as defined in claim 11, wherein the manipulating means comprises: a pressing rod formed at a tip end thereof with a wedge-shaped contact surface so as to be inserted into the adjusting rod via the horizontal hole of the cap to face at a right angle the contact surface of the adjusting rod inserted into the adjusting hole; a rotating rod rotatably inserted into the horizontal hole and horizontally supporting the pressing rod thereinside; a cam part formed at an eccentric position thereof with a pressing protruder inserted into a long hole and rotatably coupled to a circumferential tip end of the rotating rod via a key to apply pressure to or release the pressure from the pressure rod inserted into the compression hole of the cap; a coupling pin for being inserted via the pin hole of the cap and surface-coupling with a ring-shaped concave groove on the rotating rod inserted into the horizontal hole and for rotating the rotating rod and holding same in the horizontal movement;

a friction member interposed between the operation rod and the cam part relative to the long hole of the cap for applying a skin frictional force or releasing same lest that the operation rod should be rotated in response to a rotating eccentric angle of the cam part; an adjusting lever inserted into a cut-out groove formed at an external end of the rotating rod and coupled via a hinge pin inserted through the pin hole formed at an eccentric external side of the rotating rod for rotating the rotating rod to the right or reverse direction in response to vertical reciprocating movement or advancing the pressing rod in response to horizontal rotation; and a resilience member disposed at a predetermined distanced place from the hinge pin relative to the rotating rod and the adjusting lever to release the pushing force of the adjusting lever and the pressing rod and to return the adjusting lever to the original position.

18. A hydraulic cylinder comprising: a cap part coupled with a compression means for generating oil pressure, operation means connected to an object for lifting and stopping the object in association with adjusting means; a body part including the compression means, the operation means and the adjusting means and having a plurality of cylinders and pistons for carrying out an oil pressing operation; a base part coupled underneath the body part and having a flow route; an oil control mechanism for controlling oil flowing in an oil route formed inside the base part; and manipulating means disposed at the cap part for controlling the compression means, the operation means and the adjusting means; wherein the oil control mechanism includes an elongate opening with an elongate rod disposed therein, the elongate rod being adjustable in its axial location within the elongate opening, and a ball received in the elongate opening at a distal location from the elongate rod, the ball being biased by a resilience member for controlling the oil flow in the flow route of the base part in order to control lifting, and stopping of the object connected to the operation means; and wherein the oil control mechanism further comprises: a tube disposed within the elongate opening in a fluid tight manner, and the elongate rod is disposed within the tube in a fluid tight manner.

19. A hydraulic cylinder for raising an object coupled to the cylinder, comprising:

a fluid reservoir for containing operating fluid therein;

a first cylinder generally vertically arranged and defining an inner cylinder space with a first piston moveably received within the inner cylinder space of the first cylinder, an upper end of the first piston extending upwardly from the first cylinder, the first piston capable of reciprocating within the first cylinder to provide a pressure to the operating fluid received in the inner cylinder space of the first cylinder, a resilience member adapted to bias the first piston upwardly;

a second cylinder generally vertically arranged and having a second piston moveably received within an inner cylinder space of the second cylinder and defining a fluid receiving cavity therein below the second piston, the second piston capable of reciprocating within the second cylinder, a resilience member adapted to bias the second piston downwardly inserted into the second cylinder;

a third cylinder generally vertically arranged and having a third piston moveably received within an inner cylinder space of the third cylinder and defining a fluid receiving cavity therein below the third piston, the third piston capable of reciprocating within the third cylinder, an upper shaft end of the third piston extending from the third cylinder and coupled with the object;

an adjusting means generally vertically arranged and configured to select a operation mode among lifting, stopping and lowering modes; and a fluid control circuit including a fluid route and a plurality of check valves and a fluid control valve coupled with the fluid route, the fluid control circuit capable of adjusting a fluid flow in the fluid route and coupled with the first, second, and third cylinders, and the adjusting means in fluid communication therebetween for controlling lifting, stopping, and lowering operation of the third piston in the third cylinder as the operation mode selected by the adjusting means.

* * * * *